United States Patent
Arita et al.

(10) Patent No.: US 9,715,040 B2
(45) Date of Patent: Jul. 25, 2017

(54) OPTICAL FILM AND MANUFACTURING METHOD THEREOF, POLARIZING PLATE PROTECTIVE FILM, POLARIZING PLATE AND LIQUID CRYSTAL DISPLAY DEVICE

(71) Applicant: FUJIFILM Corporation, Tokyo (JP)

(72) Inventors: Shusuke Arita, Kanagawa (JP); Yutaka Nozoe, Kanagawa (JP); Hajime Nakayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 63 days.

(21) Appl. No.: 14/828,076

(22) Filed: Aug. 17, 2015

(65) Prior Publication Data

US 2016/0047946 A1    Feb. 18, 2016

(30) Foreign Application Priority Data

Aug. 18, 2014  (JP) ................. 2014-166226

(51) Int. Cl.
| | | |
|---|---|---|
| C09K 19/00 | (2006.01) | |
| G02B 1/04 | (2006.01) | |
| G02F 1/1335 | (2006.01) | |
| C08J 5/18 | (2006.01) | |

(52) U.S. Cl.
CPC ......... *G02B 1/04* (2013.01); *G02F 1/133528* (2013.01); *C08J 5/18* (2013.01); *C08J 2333/12* (2013.01); *G02F 2201/50* (2013.01); *Y10T 428/10* (2015.01); *Y10T 428/1036* (2015.01)

(58) Field of Classification Search
CPC ...... G02B 1/04; G02B 5/30; C08J 5/18; C08J 2333/06–2333/12; C08J 2421/00; C08J 2413/00; G02F 1/133528; G02F 1/13363; G02F 2201/50; B29C 55/02; B29C 47/0021; B32B 27/00; B29D 11/0073;
(Continued)

(56) References Cited

U.S. PATENT DOCUMENTS

| | | | |
|---|---|---|---|
| 2008/0158490 A1* | 7/2008 | Nakayama | B29C 55/08 349/117 |
| 2009/0135483 A1 | 5/2009 | Asano et al. | |

FOREIGN PATENT DOCUMENTS

| | | |
|---|---|---|
| JP | S63-034190 A | 2/1988 |
| JP | 2008-009378 A | 1/2008 |
| JP | 2009-292869 A | 12/2009 |

(Continued)

OTHER PUBLICATIONS

Notification of Reasons for Refusal issued by the Japanese Patent Office on May 16, 2017, in connection with Japanese Patent Application No. 2014-166226.

*Primary Examiner* — Ruiyun Zhang
(74) *Attorney, Agent, or Firm* — Edwards Neils LLC; Jean C. Edwards

(57) ABSTRACT

There is provided an optical film comprising a (meth)acrylic resin as a main component, a compound represented by the specific formula, and a rubber elastic body, and a method of manufacturing an optical film through a solution film-forming method, in which the optical film is composed of a (meth)acrylic resin as a main component, and contains a compound represented by the specific formula and a rubber elastic body, and a polarizing plate protective film having the optical film, and a polarizing plate having the polarizing plate protective film, and a liquid crystal display device provided with the polarizing plate.

11 Claims, 1 Drawing Sheet

(58) Field of Classification Search
CPC ............. Y10T 428/10; Y10T 428/1036; Y10T 428/1041; Y10T 428/105
USPC ............... 428/1.1, 1.3, 1.31, 1.33, 522, 523; 349/96, 117; 359/489.01, 489.02; 264/1.34; 525/228
See application file for complete search history.

(56) References Cited

FOREIGN PATENT DOCUMENTS

| | | | |
|---|---|---|---|
| JP | 2011-016323 A | | 1/2011 |
| JP | 2011016323 A | * | 1/2011 |

\* cited by examiner

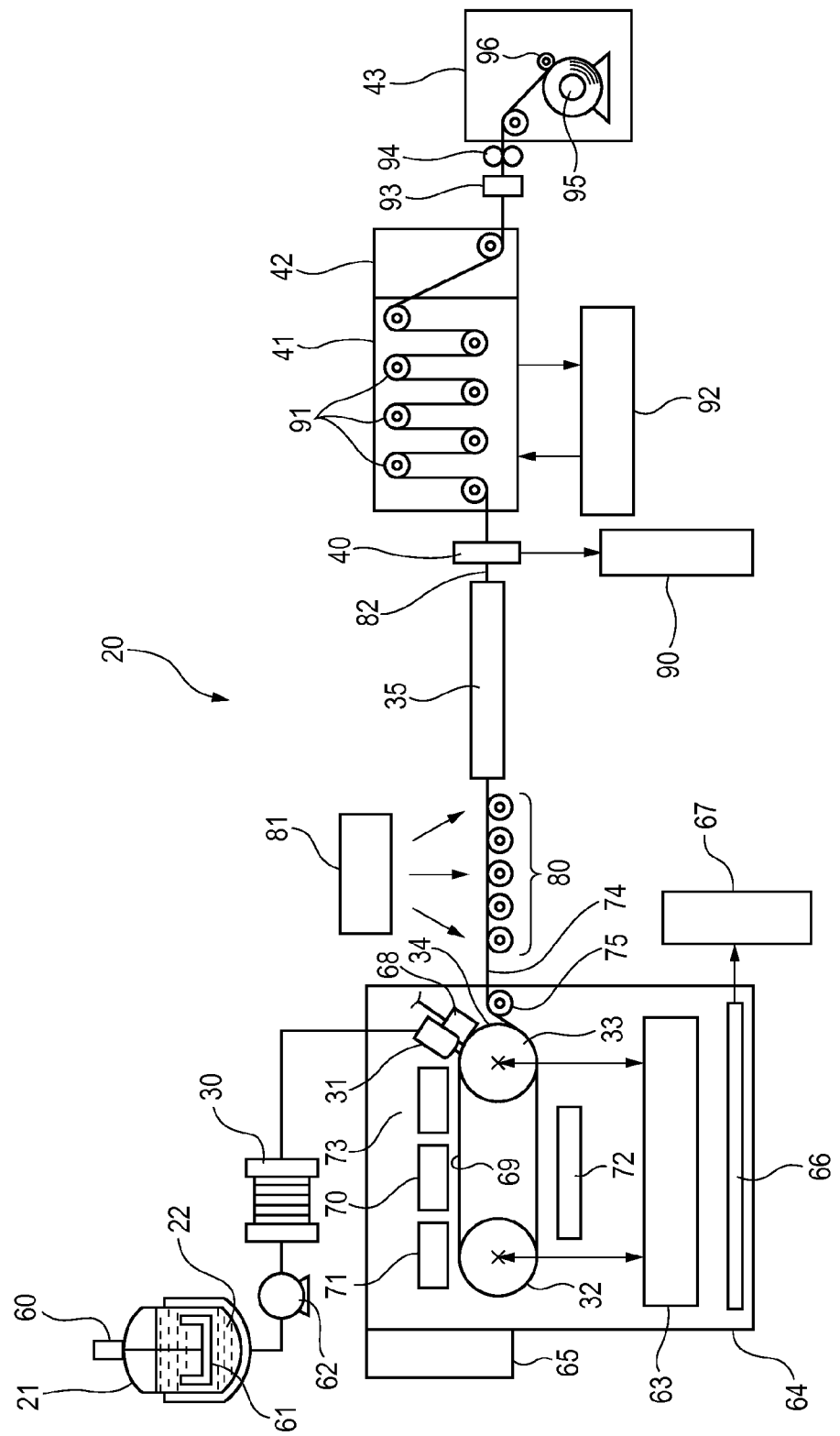

OPTICAL FILM AND MANUFACTURING METHOD THEREOF, POLARIZING PLATE PROTECTIVE FILM, POLARIZING PLATE AND LIQUID CRYSTAL DISPLAY DEVICE

CROSS-REFERENCE TO RELATED APPLICATIONS

This application claims priority from Japanese Patent Application No. 2014-166226, filed on Aug. 18, 2014, the contents of all of which are hereby incorporated by reference in their entirety.

BACKGROUND OF THE INVENTION

1. Field of the Invention

The present invention relates to an optical film and manufacturing method thereof, polarizing plate protective film, polarizing plate and liquid crystal display device.

2. Description of the Related Art

A demand for a liquid crystal display device has been expanded in applications such as a liquid crystal display for an LCD TV or a personal computer. In general, the liquid crystal display device is constituted by a liquid crystal cell and two polarizing plates provided at both sides thereof, in which the liquid crystal cell is obtained by interposing, for example, a transparent electrode, a liquid crystal layer, and a color filter between glass plates. Each polarizing plate is constituted by two optical films (polarizing plate protective films) having a polarizer (which may be referred to as a polarization film) interposed therebetween.

Meanwhile, according to a recent advance in a technology, upsizing of the liquid crystal display device has been accelerated, and at the same time, applications of the liquid crystal display device have been diversified. For example, the liquid crystal display device may be used as a large display installed on the street or in front of a shop or may be used for an advertising display using a display equipment called a digital signage in a public place.

In such applications, since an outdoor usage is envisaged, a deterioration caused by moisture adsorption of a polarizing film may be problem. Thus, it is required to reduce a moisture permeability of the polarizing plate protective film. As for a material having a low moisture permeability, polymethyl methacrylate (hereinafter, may be abbreviated as PMMA) may be exemplified. The PMMA is low in a moisture permeability and further shows an excellence in a transparency or dimensional stability, and thus is used for an optical film.

For example, Japanese Patent Laid-Open Publication No. 2011-16323 discloses a method of manufacturing an acrylic resin film by solution film formation, in which the acrylic resin film may include a crosslinked soft layer polymer showing a rubber elasticity.

SUMMARY OF THE INVENTION

However, when used as the polarizing plate protective film, the acrylic resin film is required to be further moisture-impermeable. When the present inventors manufactured an acrylic resin film disclosed in Patent Document described above, it was found that a sufficiently low moisture permeability cannot be obtained.

In view of the above described situation, an object of the present invention, that is, an object to be solved by the present invention is to provide an optical film which is low in a moisture permeability and is excellent in a heat resistance and a brittleness, and a manufacturing method thereof. Also, another object of the present invention is to provide a polarizing plate protective film, a polarizing plate and a liquid crystal display device which have the optical film.

The present inventors have conducted intensive studies. As a result, they found that in an optical film containing a (meth)acrylic resin as a main component, a compound having a specific structure which includes two or more phenolic hydroxyl groups and an alicyclic structure, and a rubber elastic body are used so as to achieve the above described object, and then completed the present invention.

That is, problems to be solved by the present invention may be solved by the present invention which is a following means.

[1] An optical film comprising:
a (meth)acrylic resin as a main component,
a compound represented by the following Formula (1), and
a rubber elastic body:

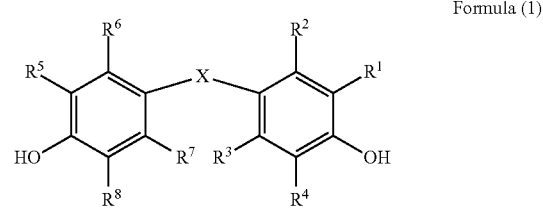

Formula (1)

wherein
each of $R^1$ to $R^8$ independently represents a hydrogen atom, a halogen atom, a hydroxyl group or a hydrocarbon group having 1 to 12 carbon atoms,
X represents a divalent alicyclic group having 4 to 20 carbon atoms,
the alicyclic group represented by X may have at least one substituent selected from a halogen atom, an aliphatic hydrocarbon group having 1 to 12 carbon atoms and an aromatic hydrocarbon group having 6 to 15 carbon atoms.

[2] The optical film as described in [1],
wherein the rubber elastic body is an acrylic rubber.

[3] The optical film as described in [1] or [2],
wherein each of $R^2$, $R^3$, $R^4$, $R^6$, $R^7$ and $R^8$ in Formula (1) represents a hydrogen atom.

[4] The optical film as described in any one of [1] to [3],
wherein each of $R^1$ and $R^5$ in Formula (1) independently represents a hydrogen atom or a methyl group.

[5] The optical film as described in any one of [1] to [4],
wherein X in Formula (1) is represented by the following Formula (X1) or Formula (X2):

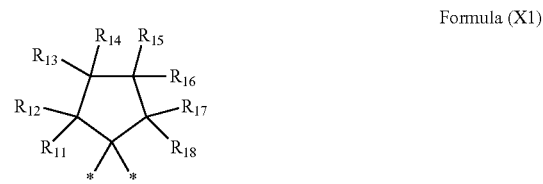

Formula (X1)

in Formula (X1),
each of $R_{11}$ to $R_{18}$ independently represents a hydrogen atom or a hydrocarbon group having 1 to 6 carbon atoms,
at least two of $R_{11}$ to $R_{18}$ may be linked to each other to form an alicyclic ring having 8 or less carbon atoms,

* represents a binding site:

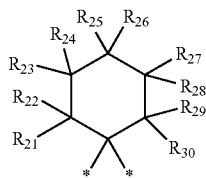

Formula (X2)

in Formula (X2), each of $R_{21}$ to $R_{30}$ independently represents a hydrogen atom or a hydrocarbon group having 1 to 6 carbon atoms, at least two of $R_{21}$ to $R_{30}$ may be linked to each other to form an alicyclic ring having 8 or less carbon atoms,

* represents a binding site.

[6] The optical film as described in [5],
wherein each of $R_{11}$ to $R_{18}$ in Formula (X1) and $R_{21}$ to $R_{30}$ in Formula (X2) independently represents a hydrogen atom or a methyl group.

[7] A method of manufacturing an optical film through a solution film-forming method,
in which the optical film is composed of a (meth)acrylic resin as a main component, and contains a compound represented by Formula (1) and a rubber elastic body:

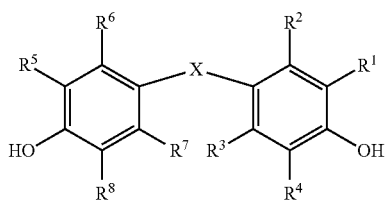

Formula (1)

wherein,
each of $R^1$ to $R^8$ independently represents a hydrogen atom, a halogen atom, a hydroxyl group or a hydrocarbon group having 1 to 12 carbon atoms,
X represents a divalent alicyclic group having 4 to 20 carbon atoms,
the alicyclic group represented by X may have at least one substituent selected from a halogen atom, an aliphatic hydrocarbon group having 1 to 12 carbon atoms and an aromatic hydrocarbon group having 6 to 15 carbon atoms.

[8] A polarizing plate protective film having the optical film as described in any one of [1] to [6].

[9] A polarizing plate having the polarizing plate protective film described in [8].

[10] A liquid crystal display device provided with the polarizing plate described in [9].

The present invention may provide an optical film which is low in a moisture permeability and is excellent in a heat resistance and a brittleness, and a manufacturing method thereof. Also, the present invention may provide a polarizing plate protective film, a polarizing plate and a liquid crystal display device which employ the optical film of the present invention.

BRIEF DESCRIPTION OF DRAWINGS

FIGURE is a schematic view for explaining a manufacturing process of a (meth)acrylic resin film.

DESCRIPTION OF REFERENCE NUMERALS AND SIGNS

20: Film production line
21: Stock tank
22: Dope
30: Filtration device
31: Casting die
32, 33: Rotating roller
34: Metal support
35: Tenter dryer
40: Selvedge cutting device
41: Drying chamber
42: Cooling chamber
43: Winding chamber
60: Motor
61: Stirrer
63: Heat transfer medium circulator
64: Casting chamber
65: Temperature regulator
66: Condenser (capacitor)
67: Recovery device
68: Decompression chamber
69: Casting film
70, 71, 72, 73: Blowing port
74: Polymer film
80: Transfer section
81: Blower
82: Film
90: Crusher
91: Roller
92: Adsorption recovery device
93: Forced-neutralization device (neutralization bar)
94: Knurling roller
95: Winding roller
96: Press roller

DETAILED DESCRIPTION OF THE INVENTION

Hereinafter, the present invention will be described in detail. The descriptions of the constituent features described below may be made based on representative exemplary embodiments or specific examples of the present invention, but the present invention is not limited to the exemplary embodiments. Also, in the present specification, a numerical range expressed by using "to" means a range including numerical values described before and after "to" as a lower limit and an upper limit.

<Optical Film>

An optical film of the present invention is an optical film containing a (meth)acrylic resin as a main component, and contains a compound represented by Formula (1) below, and a rubber elastic body.

Meanwhile, "containing a (meth)acrylic resin as a main component" indicates that a (meth)acrylic resin is contained in an amount of 50% by mass or more, based on the mass of the optical film. (In this specification, mass ratio is equal to weight ratio.)

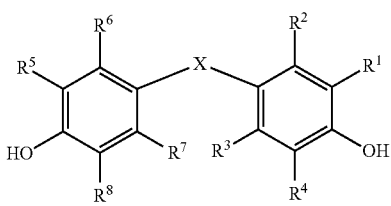

Formula (1)

Each of $R^1$ to $R^8$ independently represents a hydrogen atom, a halogen atom, a hydroxyl group or a hydrocarbon group having 1 to 12 carbon atoms. X represents a divalent alicyclic group having 4 to 20 carbon atoms. An alicyclic group represented by X may have at least one substituent selected from a halogen atom, an aliphatic hydrocarbon group having 1 to 12 carbon atoms, and an aromatic hydrocarbon group having 6 to 15 carbon atoms.

[(Meth)Acrylic Resin]

The optical film of the present invention has a (meth) acrylic resin as a main component. The "(meth)acrylic resin" in the present invention may be either "acrylic resin" or "methacrylic resin," or a copolymer of "acrylic resin" and "methacrylic resin," and also may include other structural units as described below.

The (meth)acrylic resin preferably includes a structural unit derived from methyl methacrylate, and may or may not include a structural unit derived from alkyl(meth)acrylate other than methyl methacrylate.

In the (meth)acrylic resin, the content of the structural unit derived from methyl methacrylate is preferably 95% by mass or more, and the content of the structural unit derived from alkyl(meth)acrylate other than methyl methacrylate is less than 5% by mass.

When the (meth)acrylic resin includes the structural unit derived from alkyl(meth)acrylate other than methyl methacrylate, the structural unit derived from alkyl(meth)acrylate may be exemplified as describe below.

(Structural Unit Derived from Alkyl(Meth)Acrylate Other than Methyl Methacrylate)

Examples of alkyl(meth)acrylate other than methyl methacrylate may include acrylic acid esters (preferably, alkyl acrylate in which an alkyl group has 1 to 18 carbon atoms) such as methyl acrylate, ethyl acrylate, n-butyl acrylate, isobutyl acrylate, t-butyl acrylate, cyclohexyl acrylate, benzyl acrylate; and methacrylic esters (preferably, alkylmethacrylates in which an alkyl group has 2 to 18 carbon atoms) such as ethyl methacrylate, propyl methacrylate, n-butyl methacrylate, isobutyl methacrylate, t-butyl methacrylate, cyclohexyl methacrylate, benzyl methacrylate, and these may be used alone or in a combination of two or more kinds thereof.

(Another Structural Unit)

The (meth)acrylic resin used in the present invention may include a structural unit other than those described above. Examples of such a structural unit may include an α,β-unsaturated acid such as acrylic acid or methacrylic acid, an unsaturated group-containing bicarboxylic acid such as maleic acid, fumaric acid or itaconic acid, an aromatic vinyl compound such as styrene or α-methylstyrene, an α,β-unsaturated nitrile such as acrylonitrile or methacrylonitrile, maleic acid anhydride, maleimide, N-substituted maleimide, and glutaric acid anhydride. One kind of structural unit alone may be introduced into a (meth)acrylic resin, or two or more kinds of structural units in combination may be introduced into a (meth)acrylic resin.

Among these, in view of a thermal decomposition resistance or fluidity of a copolymer, for example, methyl acrylate, ethyl acrylate, n-propyl acrylate, n-butyl acrylate, s-butyl acrylate, and 2-ethyl hexyl acrylate are preferred, and methyl acrylate or n-butyl acrylate is particularly preferably used.

(Content of Structural Unit Derived from Methyl Methacrylate)

In the (meth)acrylic resin, in order to sufficiently exhibit the effect of the present invention, the content of the structural unit derived from methyl methacrylate preferably ranges from 95% by mass to 100% by mass, more preferably 97% by mass to 100% by mass, and further preferably is 100% by mass.

When the ratio of the structural unit derived from methyl methacrylate is 95% by mass or more, a (meth)acrylic resin having a high heat resistance may be obtained.

In the (meth)acrylic resin, the content of the structural unit derived from alkyl(meth)acrylate other than methyl methacrylate is preferably less than 5% by mass, more preferably less than 3% by mass, and is particularly preferably 0% by mass (that is, the structural unit derived from alkyl(meth) acrylate other than methyl methacrylate is not included).

(Producing Method of (Meth)Acrylic Resin)

A (meth)acrylic resin may be a commercially available product or may be obtained by a conventionally known synthesis method.

As for a method of producing the (meth)acrylic resin, emulsion polymerization, solution polymerization, bulk polymerization, and suspension polymerization may be employed. Among these, in production of a high molecular weight material of the present invention, emulsion polymerization and suspension polymerization are more preferred.

As for an initiator for suspension polymerization, a conventional initiator used for the suspension polymerization may be used, and examples thereof may include organic peroxides, and azo compounds.

As for a suspension stabilizer, a conventionally known stabilizer which is generally used may be used, and examples thereof may include an organic colloidal polymer substance, an inorganic colloidal polymer substance, inorganic fine particles and their combinations with a surfactant.

(Weight-Average Molecular Weight of (Meth)Acrylic Resin)

A "weight-average molecular weight" in the present invention refers to a weight-average molecular weight measured by gel permeation chromatography.

The weight-average molecular weight of the (meth) acrylic resin is not particularly limited, but in order to sufficiently exhibit the effect of the present invention, the weight-average molecular weight of the (meth)acrylic resin preferably ranges from 80,000 to 3,000,000, more preferably from 80,000 to 2,500,000, and further preferably from 250,000 to 2,000,000. Such a range of the weight-average molecular weight of the (meth)acrylic resin is higher than the weight-average molecular weight of (meth)acrylic resin used for melted film formation, and is appropriate for a solution film formation.

When the weight-average molecular weight of the (meth) acrylic resin is 80,000 or more, even in a case where the concentration of the (meth)acrylic resin is low (e.g., 10% by mass) in a composition (dope composition) for forming the optical film, the viscosity of the dope composition may be high. Thus, it is possible to suppress streaks from entering a casting film during ejection from a casting die. When the weight-average molecular weight (Mw) of the (meth)acrylic resin is 80,000 or more, a breaking elongation of the (meth)acrylic resin film in an unstretched state is elongated, and thus a handling suitability is excellent during film production.

In view of a polymerization process, a weight-average molecular weight of the (meth)acrylic resin is 3,000,000 or less.

A "weight-average molecular weight (Mw)" in the present invention refers to a weight-average molecular weight measured by gel permeation chromatography under the following conditions.

| | |
|---|---|
| Solvent | tetrahydrofuran |
| Device name | TOSOH HLC-8220GPC |
| Column | three columns (TOSOH TSKgel Super HZM-H (4.6 mm × 15 cm)) are connected in use. |
| Column temperature | 25° C. |
| Sample concentration | 0.1% by mass |
| Flow rate | 0.35 ml/min |
| Calibration curve | calibration curves made with 7 samples of TSK standard polystyrene manufactured by TOSOH (Mw = 2800000 to 1050) were used. |

(Concentration of (Meth)Acrylic Resin)

The concentration of the (meth)acrylic resin in the dope composition is varied according to a thickness of a film to be formed, but preferably ranges from 10% to 40% by mass, more preferably from 10% to 30% by mass, and further preferably from 15% to 25% by mass. Accordingly, a dope composition with an appropriate viscosity may be obtained so that a film having a good surface shape may be obtained with a desired thickness.

[Other Resins]

The optical film of the present invention may contain resins other than the above described (meth)acrylic resin in a range not impairing the effect of the present invention.

Examples of such resins may include olefin-based thermoplastic resins such as polyethylene, polypropylene, ethylene-propylene copolymer, and poly(4-methyl-1-pentent); halogen-containing thermoplastic resins such as vinyl chloride, and chlorinated vinyl resin; acrylic thermoplastic resins such as polymethyl methacrylate; styrene-based thermoplastic resins such as polystyrene, styrene-methyl methacrylate copolymer, styrene-acrylonitrile copolymer, and acrylonitrile butadiene-styrene block copolymer; polyesters such as polyethylene terephthalate, polybutylene terephthalate, and polyethylene naphthalate; polyamides such as nylon6, nylon66, and nylon610; polyacetal; polycarbonate; polyphenylene oxide; polyphenylene sulfide; polyether ether ketone; polysulfone; polyether sulfone; polyoxybenzylene; polyamide imide; and rubber polymers such as an ABS resin or an ASA resin blended with polybutadiene-based rubber and acrylic rubber. In the present invention, as resins other than the (meth)acrylic resin, a cellulose resin such as cellulose acylate is not included.

When a resin other than the (meth)acrylic resin is contained in the optical film, the resin to be added may be placed in a compatible state, or may be mixed without being dissolved.

[Compound Represented by Formula (1)]

The optical film of the present invention contains a compound represented by Formula (1).

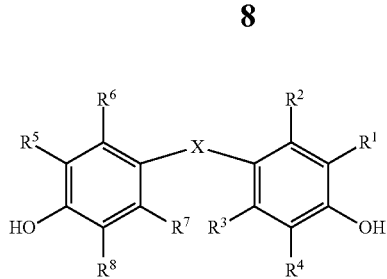

Formula (1)

Each of $R^1$ to $R^8$ independently represents a hydrogen atom, a halogen atom, a hydroxyl group or a hydrocarbon group having 1 to 12 carbon atoms. X represents a divalent alicyclic group having 4 to 20 carbon atoms. An alicyclic group represented by X may have at least one substituent selected from a halogen atom, an aliphatic hydrocarbon group having 1 to 12 carbon atoms, and an aromatic hydrocarbon group having 6 to 15 carbon atoms.

In Formula (1), each of $R^1$ to $R^8$ independently represents a hydrogen atom, a halogen atom, a hydroxyl group or a hydrocarbon group having 1 to 12 carbon atoms. As for the halogen atom, a fluorine atom, a chlorine atom, a bromine atom or an iodine atom is preferred, and a fluorine atom or a chlorine atom is more preferred. As for the hydrocarbon group having 1 to 12 carbon atoms, an alkyl group, an alkenyl group, an alkynyl group, and an aryl group may be exemplified. As for the alkyl group having 1 to 12 carbon atoms, a linear, branched or cyclic alkyl group may be exemplified, and specifically, a methyl group, an ethyl group, an isopropyl group, a n-butyl group, an i-butyl group, a s-butyl group, a t-butyl group, a n-hexyl group, and a cyclohexyl group are preferred. As for the aryl group, a phenyl group, and a naphthyl group may be exemplified, and a phenyl group is preferred.

In view of the compatibility and moisture permeability, each of $R^2$, $R^3$, $R^4$, $R^6$, $R^7$ and $R^8$ preferably represents a hydrogen atom.

In view of being able to manufacture a film having a low moisture permeability due to interaction with a (meth) acrylic resin, it is desirable that each of $R^1$ and $R^5$ independently represents a hydrogen atom or a methyl group.

In Formula (1), X represents a divalent alicyclic group having 4 to 20 carbon atoms. Here, a "divalent alicyclic group" refers to a divalent linking group having an alicyclic ring, which represents a group having two bonds to one of carbon atoms which constitute the alicyclic ring.

The divalent alicyclic group having 4 to 20 carbon atoms, which is represented by X, is preferably an alicyclic group having 4 to 15 carbon atoms, and more preferably an alicyclic group having 5 to 12 carbon atoms.

Specifically, as for X, cyclobutyl, cyclopentyl, cyclohexyl, cyclooctyl, norbornane, decahydronaphthalene, and tricyclo[5.2.1.0(2,6)]decane are preferred, and cyclopentyl, cyclohexyl, norbornane, and tricyclo[5.2.1.0(2,6)]decane are more preferred.

The alicyclic group represented by X may have a structure in which an aromatic ring is fused with an alicyclic ring.

The alicyclic group represented by X may have at least one substituent selected from a halogen atom, an aliphatic hydrocarbon group having 1 to 12 carbon atoms, and an aromatic hydrocarbon group having 6 to 15 carbon atoms. As for the halogen atom, a fluorine atom, a chlorine atom, a bromine atom or an iodine atom is preferred, and a fluorine atom or a chlorine atom is more preferred. As for the alkyl group having 1 to 12 carbon atoms, a linear, branched or cyclic alkyl group may be exemplified, and specifically, a methyl group, an ethyl group, an isopropyl group, a t-butyl group, a cyclopentyl group and a cyclohexyl group are preferred. As for the aromatic hydrocarbon group having 6 to 15 carbon atoms, a phenyl group, and a naphthyl group are preferred, and a phenyl group is more preferred.

In view of being able to manufacture a film having a lower moisture permeability, it is particularly preferable that X in Formula (1) is represented by Formula (X1) or Formula (X2) below.

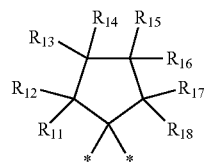

Formula (X1)

In Formula (X1), each of $R_{11}$ to $R_{18}$ independently represents a hydrogen atom or a hydrocarbon group having 1 to 6 carbon atoms. At least two of $R_{11}$ to $R_{18}$ may be linked to each other to form an alicyclic ring having 8 or less carbon atoms. * represents a binding site.

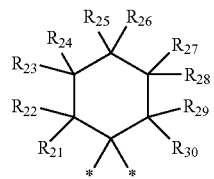

Formula (X2)

In Formula (X2), each of $R_{21}$ to $R_{30}$ independently represents a hydrogen atom or a hydrocarbon group having 1 to 6 carbon atoms. At least two of $R_{21}$ to $R_{30}$ may be linked to each other to form an alicyclic ring having 8 or less carbon atoms. * represents a binding site.

In Formula (X1), each of $R_{11}$ to $R_{18}$ independently represents a hydrogen atom or a hydrocarbon group having 1 to 6 carbon atoms. As for the hydrocarbon group having 1 to 6 carbon atoms, an alkyl group, an alkenyl group, an alkynyl group, and an aryl group may be exemplified. As for the alkyl group, a linear, branched or cyclic alkyl group may be exemplified, and specifically, a methyl group, an ethyl group, an isopropyl group, a t-butyl group, a cyclopentyl group, and a cyclohexyl group are preferred. As for the aryl group, a phenyl group may be exemplified.

At least two of $R_{11}$ to $R_{18}$ may be linked to each other to form an alicyclic ring having 8 or less carbon atoms. As for the alicyclic ring having 8 or less carbon atoms, a cyclopentane ring, and a cyclohexane ring are preferred.

In view of being able to manufacture a film having a lower haze, it is preferable that each of $R_{11}$ to $R_{18}$ in Formula (X1) and each of $R_{21}$ to $R_{30}$ in Formula (X2) independently represents a hydrogen atom or a methyl group.

Specific examples of the compound represented by Formula (1) are as follows, but the present invention is not limited thereto.

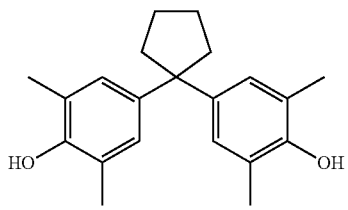

A-1

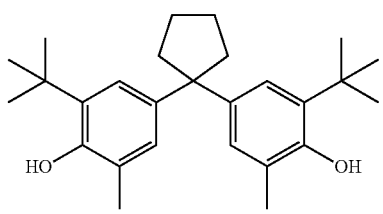

A-2

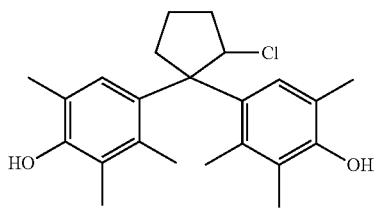

A-3

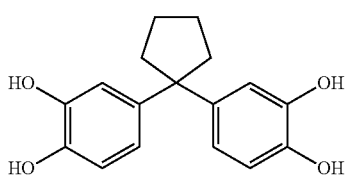

A-4

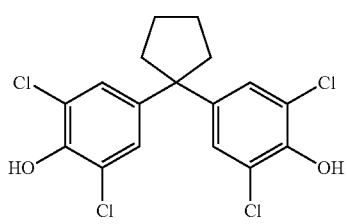

A-5

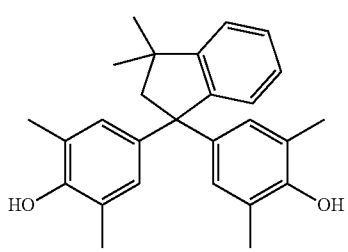

A-6

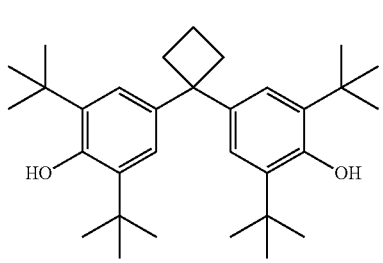

A-7

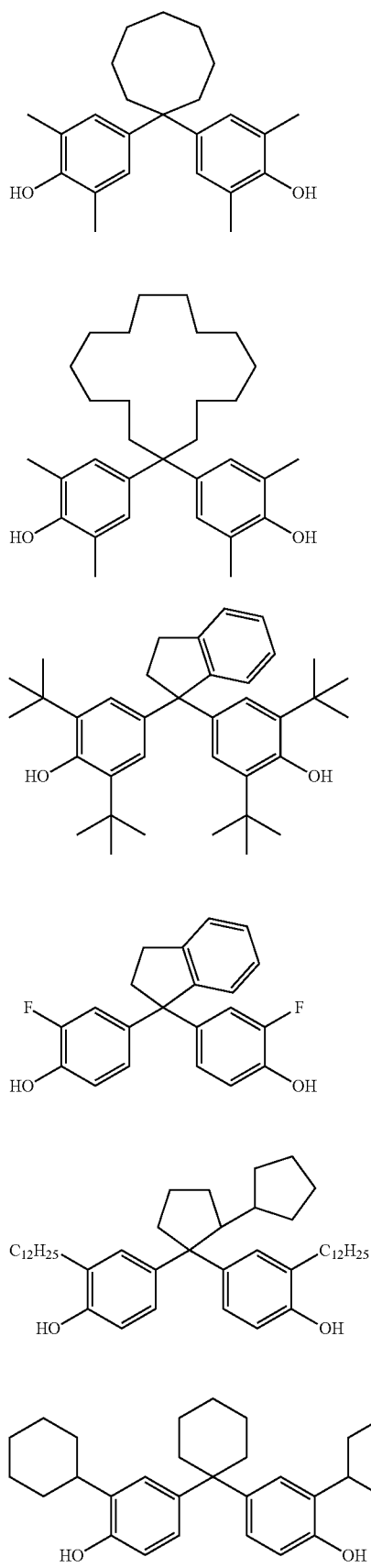
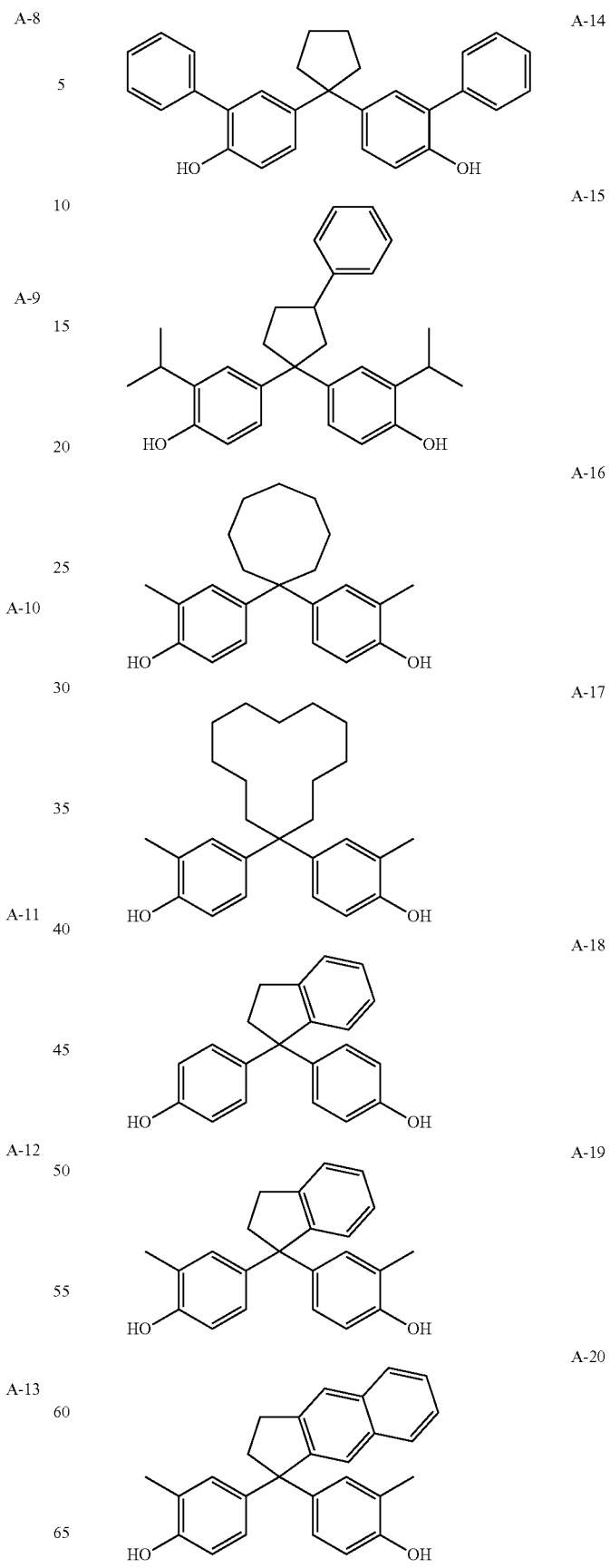

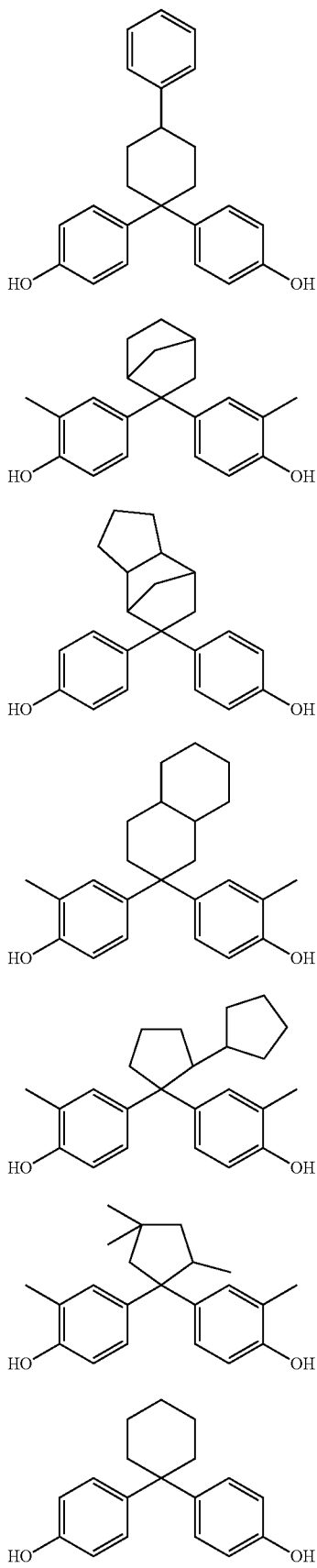
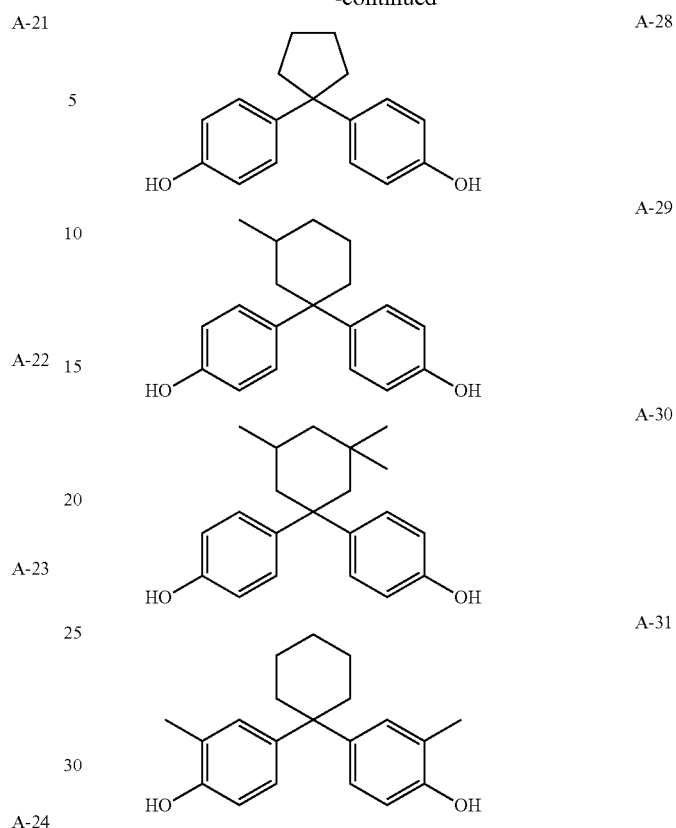

(Method of Producing Compound Represented by Formula (1))

A compound represented by Formula (1) may be obtained by a conventionally known method in which cycloalkyl ketones and phenols are subjected to dehydrating condensation in the presence of an acid catalyst. In the dehydrating condensation reaction, as for the acid catalyst, for example, a mineral acid such as hydrochloric acid, hydrogen chloride gas, and sulfuric acid, a methanesulfonic acid, and a solid acid are appropriate.

(Content of Compound Represented by Formula (1))

In the optical film of the present invention, in view of the moisture permeability, the content of the compound represented by Formula (1) is preferably 10 parts by mass or more, and more preferably 20 parts by mass or more based on 100 parts by mass of (meth)acrylic resin. Also, in view of compatibility, the content is preferably 50 parts by mass or less, and more preferably 40 parts by mass or less based on 100 parts by mass of (meth)acrylic resin.

[Rubber Elastic Body]

The optical film of the present invention contains a rubber elastic body. The content of the rubber elastic body preferably ranges from 5% to 30% by mass, more preferably from 5% to 25% by mass, and further preferably from 5% to 20% by mass based on the mass of the optical film. It is desirable that the content of the rubber elastic body is within the above described range, because a brittleness may be improved without increasing a haze.

The rubber elastic body in the present invention is not particularly limited, but may be a compatible type rubber elastic body or a dispersion type rubber elastic body having a nano-particle structure. Particularly, in view of compatibility or dispersibility, an acrylic rubber is preferred.

[Acrylic Rubber]

In the present invention, an acrylic rubber is not particularly limited as long as it is an acrylic polymer which is rubbery at room temperature. However, in view of transparency and strength, rubber particles having a form of multi-layered structure particles are preferred. Multi-layered structure particles refer to particles having a multi-layered structure such as a two-layered structure including a core-shell structure, a three-layered structure including a center hard layer, a soft layer, and an outermost hard layer, and a four-layered structure further having an intermediate hard layer between the soft layer and the outermost hard layer.

The acrylic rubber particles having the two-layered structure refer to rubber particles having a core-shell structure including a core layer composed of a rubbery polymer and a shell layer composed of an acrylic glassy polymer. In the acrylic rubber particles having the two-layered structure, since the rubbery polymer is used for the core layer and acts as a concentration point of stress, a trimming property of the optical film is improved. Also, since the acrylic glassy polymer is used for the shell layer, the compatibility of the rubber particles with a matrix resin (acrylic resin) is improved, and thus the dispersibility of the rubber particles in the resin is improved.

The rubbery polymer used for the core layer is not particularly limited as long as it is rubbery at room temperature. For example, a rubbery polymer mainly composed of butadiene (e.g., a butadiene homopolymer, or a butadiene-aromatic vinyl copolymer) or a rubbery polymer mainly composed of acrylic acid alkyl ester (e.g., a butylacrylate-styrene copolymer, or a 2-ethyl hexyl acrylate-styrene copolymer) may be used. Among these, in view of strength, productivity and transparency, a butylacrylate-styrene copolymer is preferred.

The glassy polymer used for the shell layer is not particularly limited as long as it is an acrylic polymer that is glassy at room temperature. For example, a methyl methacrylate homopolymer, or a methyl methacrylate-methyl acrylate copolymer may be used.

As for the acrylic rubber particles having the two-layered structure, rubber particles disclosed in, for example, Japanese Patent Laid-Open Publication No. S53-58554 and Japanese Patent Laid-Open Publication No. S55-94917 may be used.

Acrylic rubber particles having the three-layered structure or the four-layered structure refer to rubber particles having a multi-layered structure in which a soft layer composed of a rubbery polymer, and a hard layer composed of a glassy polymer are laminated in three or more layers. The rubbery polymer used for the soft layer and the glassy polymer used for the hard layer may be the same as those exemplified above in the acrylic rubber particles having the two-layered structure.

As for the acrylic rubber particles having the three-layered structure or the four-layered structure, for example, rubber particles disclosed in the following publications may be used.

Example 1: Japanese Examined Patent Application Publication No. S60-17406

Acrylic rubber particles having a multi-layered structure obtained by a method of manufacturing a multi-layered structure acrylic resin molding material in which a molecular weight of a third layer becomes gradually smaller toward the outside from the inside.

The method includes: (A) a first layer forming step of carrying out emulsion polymerization of methyl methacrylate alone or a mixture of methyl methacrylate and a monomer copolymerizable with methyl methacrylate so as to form a dispersion of the polymer mainly composed of methyl methacrylate with a glass transition point of 25° C. or more, (B) a second layer forming step in which to the resultant product described above, a mixture which mainly contains alkyl acrylate that forms a copolymer having a glass transition point of 25° C. or less when polymerized alone, at least one of a monomer copolymerizable with this and a polyfunctional cross-linking agent, and 0.1% to 5% by mass of a polyfunctional grafting agent based on the total mass of the mixture is added, followed by emulsion polymerization, and (C) a third layer forming step in which to the resultant product described above, a methyl methacrylate or a monomer mixture mainly composed of methyl methacrylate which forms a polymer having a glass transition point of 25° C. or more when polymerized alone is added, in which a chain transfer agent is sequentially increased, followed by emulsion polymerization in multi stages.

Example 2: Japanese Patent Laid-Open Publication No. H8-245854

Acrylic multi-layered structure polymer powder including coagulated powder obtained by coagulating an emulsified latex of an acrylic multi-layered structure polymer which has at least one soft polymer layer and a hard polymer layer. The soft layer includes a polymer in which a melting start temperature of the polymer is 235° C. or more, and a glass transition temperature (Tg) is 25° C. or less when polymerized alone in an inner layer, and the hard layer includes a polymer in which a Tg is 50° C. or more when polymerized alone in the outermost layer. In the powder, a ratio of fine powder is 40% by mass in which a particle diameter of the dried coagulated powder is 212 μm or less, and a porosity volume is 0.7 cc or less per unit area in which the pore diameter of the dried coagulated powder measured by a mercury porosimetry is 5 μm or less.

Example 3: Japanese Examined Patent Application Publication No. H7-68318

A multi-layered structure acrylic polymer including (A) 25% to 45% by mass of an innermost hard layer polymer obtained by polymerizing a monomer mixture which includes 90% to 99% by mass of methyl methacrylate, 1% to 10% by mass of alkyl acrylate in which an alkyl group has 1 to 8 carbon atoms, and 0.01% to 0.3% by mass of a graft-linking monomer copolymerizable with them which includes at least one kind selected from aryl, methallyl and crotyl ester of α,β-unsaturated carboxylic acid, (B) 35% to 45% by mass of a soft layer polymer obtained by polymerizing a monomer mixture which includes 70% to 90% by mass of n-butylacrylate, 10% to 30% by mass of styrene, and 1.5% to 3.0% by mass of a graft-linking monomer copolymerizable with them which includes at least one kind selected from aryl, methallyl and crotyl ester of α,β-unsaturated carboxylic acid, in the presence of the innermost hard layer polymer, and (C) 20% to 30% by mass of an outermost hard layer polymer obtained by polymerizing a monomer mixture which includes 90% to 99% by mass of methyl methacrylate in which an alkyl group has 1 to 8 carbon atoms, in the presence of the polymer formed of the innermost hard layer and the soft layer, in which (D) a mass ratio of soft layer polymer/(innermost hard layer polymer+soft layer polymer) ranges from 0.45 to 0.57, and (E) an average particle diameter ranges from 0.2 μm to 0.3 μm. When the multi-layered structure acrylic polymer is fractionated with acetone, (F) the grafting ratio ranges from 20% to 40% by mass, and (G) the tensile elastic modulus of the acetone insoluble portion ranges from 1000 kg/m$^2$ to 4000 kg/m$^2$.

In addition, acrylic rubber particles having a three-layered structure or a four-layered structure, for example, acrylic rubber particles disclosed in Japanese Examined Patent Application Publication No. S55-27576, Japanese Examined Patent Application Publication No. S58-1694, Japanese Examined Patent Application Publication No. S59-36645, Japanese Examined Patent Application Publication No. S59-36646, Japanese Examined Patent Application Publication No. S62-41241, Japanese Patent Laid-Open Publication No. S59-202213, Japanese Patent Laid-Open Publication No. S63-27516, Japanese Patent Laid-Open Publication No. S51-129449, and Japanese Patent Laid-Open Publication No. S52-56150 may be used.

(Additive)

In the optical film of the present invention, as for additives, a plasticizer, an UV absorber, an antioxidant, a brittleness modifier, and an optical expression agent may be added.

The plasticizer has a function of improving the fluidity or flexibility of the dope composition. As for the plasticizer, phthalic acid ester-based, fatty acid ester-based, trimellitic acid ester-based, phosphoric acid ester-based, polyester-based and epoxy-based plasticizers may be exemplified.

As for the UV absorber, benzotriazole-based, 2-hydroxybenzophenone-based and phenyl salicylate ester-based UV absorbers may be exemplified. For example, triazoles such as 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, and benzophenones such as 2-hydroxy-4-methoxybenzophenone, 2-hydroxy-4-octoxybenzophenone, 2,2'-dihydroxy-4-methoxybenzophenone may be exemplified.

As for the antioxidant, any compound which prevents the oxidation of (meth)acrylic resin may be suitably added. A vinyl group-containing phenolic antioxidant capable of trapping alkyl radicals generated at the initial stage of the autoxidation of a resin is particularly preferred, and for example, SUMILIZER GM, and SUMILIZER GS manufactured by Sumitomo Chemical Company, Limited may be exemplified. The antioxidant of the above described compound represented by Formula (1) has an action mechanism for trapping or decomposing peroxide radicals generated at the mid-late stages of the autoxidation of the resin. Thus, by adding an antioxidant suitable for each case, an effect may be expected.

In the optical film of the present invention, for example, various antioxidants, brittleness modifiers, and optical expression agents may also be added as additives to improve a thermal decomposable property or heat coloration during molding.

As for the additives described above, only one kind of additive may be used alone, or two more kinds thereof may be used in combination.

[Solvent]

A solvent used for the (meth)acrylic resin composition is not particularly limited as long as it dissolves a (meth) acrylic resin, a compound represented by Formula (1), a rubber elastic body, and other additives added as required. In the present invention, as for an organic solvent, either a chlorine-based solvent having a chlorine-based organic solvent as a main solvent, or a non-chlorine-based solvent not containing a chlorine-based organic solvent may be used. A mixture of two or more kinds of organic solvents may be used.

When the (meth)acrylic resin composition is prepared, as for the main solvent, a chlorine-based organic solvent is preferably used. In the present invention, the kind of the chlorine-based organic solvent is not particularly limited as long as its purpose can be achieved in which a (meth)acrylic resin, a compound represented by Formula (1), a rubber elastic body, and additives included in the (meth)acrylic resin composition are dissolved to be casted and to form a film. As for the chlorine-based organic solvent, dichloromethane, or chloroform is preferred. Particularly, dichloromethane is preferred. There is no particular problem in mixing with an organic solvent other than the chlorine-based organic solvent. In such a case, it is required that dichloromethane is used in an amount of at least 50% by mass based on the total amount of the organic solvent. Another organic solvent to be used in combination with the chlorine-based organic solvent in the present invention will be described below. That is, as for another organic solvent, a solvent selected from, for example, esters having 3 to 12 carbon atoms, ketones, ethers, alcohols, hydrocarbons is preferred. Esters, ketones, ethers and alcohols may have cyclic structures. Compounds having at least two of functional groups of esters, ketones and ethers (that is, —O—, —CO— and —COO—) may be used as a solvent, and may have another functional group such as an alcoholic hydroxyl group at the same time. In a case of a solvent having two or more kinds of functional groups, the number of carbon atoms falls within the range of the carbon number specified for the compound having any of those functional groups.

Examples of the esters having a carbon number of 3 to 12 may include ethyl formate, propyl formate, pentyl formate, methyl acetate, ethyl acetate and pentyl acetate. Examples of the ketones having a carbon number of 3 to 12 may include acetone, methyl ethyl ketone, diethyl ketone, diisobutylketone, cyclopentanone, cyclohexanone and methylcyclohexanone. Examples of the ethers having a carbon number of 3 to 12 may include diisopropylether, dimethoxymethane, dimethoxyethane, 1,4-dioxane, 1,3-dioxolane, tetrahydrofuran, anisole and phenetole. Examples of the organic solvent having two or more kinds of functional groups may include 2-ethoxyethylacetate, 2-methoxyethanol and 2-butoxyethanol.

An alcohol to be used in combination with the chlorine-based organic solvent may be preferably linear, branched or cyclic, and particularly, saturated aliphatic hydrocarbon is preferred. A hydroxyl group of the alcohol may be primary, secondary or tertiary. Examples of the alcohol may include methanol, ethanol, 1-propanol, 2-propanol, 1-butanol, 2-butanol, t-butanol, 1-pentanol, 2-methyl-2-butanol and cyclohexanol. Meanwhile, as for the alcohol, fluorine-based alcohols may also be used. For example, 2-fluoroethanol, 2,2,2-trifluoroethanol, and 2,2,3,3-tetrafluoro-1-propanol may also be exemplified. Also, the hydrocarbon may be linear, branched or cyclic. Either an aromatic hydrocarbon or an aliphatic hydrocarbon may be used. The aliphatic hydrocarbon may be saturated or unsaturated. Examples of the hydrocarbon may include cyclohexane, hexane, benzene, toluene and xylene.

As for other solvents, for example, solvents disclosed in Japanese Patent Laid-Open Publication No. 2007-140497 may be used.

The (meth)acrylic resin composition includes a mixed solvent as for a solvent, the mixed solvent including (A)

methylene chloride and (B) alcohol having 1 to 4 carbon atoms. A mass ratio (A:B) of (A) methylene chloride to (B) alcohol having 1 to 4 carbon atoms preferably ranges from 85:15 to 50:50. Meanwhile, in the following description, the methylene chloride may be referred to as a solvent (A), and the alcohol having 1 to 4 carbon atoms may be referred to as a solvent (B).

Through such a solvent composition, a polymer film obtained by drying the casting film of a (meth)acrylic resin composition may be easily peeled off from a support.

(Alcohol Having 1 to 4 Carbon Atoms)

As for (B) alcohol having 1 to 4 carbon atoms used for the mixed solvent, methanol, ethanol, and isopropanol may be preferably used, and it is more preferable to use methanol and ethanol, and it is most preferable to use only methanol.

(Mixing Ratio A:B)

A mixing ratio (A:B) of (A) methylene chloride to (B) alcohol having 1 to 4 carbon atoms in the solvent preferably ranges from 85:15 to 50:50. The ratio of A:B more preferably ranges from 85:15 to 60:40, further more preferably from 85:15 to 70:30, and most preferably 85:15 to 75:25. When the mixing ratio (A:B) is within this range, the above described effect of easy film peeling may be securely obtained.

[Concentration of Solids]

The concentration of solids in the (meth)acrylic resin composition is preferably 10% by mass or more, and more preferably 30% by mass or less. Accordingly, a high-quality film in which a film thickness unevenness is suppressed may be obtained. Also, in the (meth)acrylic resin composition, the concentration of solids is preferably 25% by mass or less, and more preferably 22% by mass or less. Accordingly, an effect of facilitating film peeling by an alcohol as described below may be securely obtained.

The characteristics of the optical film of the present invention will be described below.

(Moisture Permeability of Optical Film in Terms of 40 μm)

In the present specification, "moisture permeability in terms of 40 μm" of optical film refers to a standard value obtained by converting the moisture permeability of a film based on a film thickness of 40 μm, in which the moisture permeability is measured under conditions of temperature 40° C. and 90% RH in accordance with the method defined in JIS Z-0208. In samples differing in film thickness, the values need to be converted based on 40 μm.

Here, the thickness of the optical film of the present invention preferably ranges from 10 μm to 60 μm, more preferably from 10 μm to 50 μm, and further preferably from 20 μm to 50 μm.

Meanwhile, it is assumed that the moisture permeability in terms of 40 μm is converted according to the following mathematical formula.

Mathematical formula:
moisture permeability in terms of 40 μm=measured moisture permeability×measured film thickness (μm)/40 (μm)

The moisture permeability in terms of 40 μm of the optical film of the present invention is preferably 70 g/m²/day or less, more preferably 50 g/m²/day or less, and still more preferably 40 g/m²/day or less so that in the liquid crystal display device employing the optical film of the present invention, warpage of a liquid crystal cell or display unevenness in black display may be suppressed after elapse of time in environment of room temperature, high-humidity or high temperature/high humidity.

(Glass Transition Temperature of Optical Film)

The glass transition temperature (Tg) in the present specification is obtained using a dynamic viscoelasticity measuring device as described below.

A film sample (unstretched, 5 mm×30 mm) of the present invention is humidified at 25° C. and 60% RH for two hours or more, and then measured by a dynamic viscoelasticity measuring device (Vibron: DVA-225 (manufactured by ITK Co., Ltd.)) at a chuck-to-chuck distance of 20 mm, a temperature rise rate of 2° C./min, a measurement temperature range from 30° C. to 250° C., and a frequency of 1 Hz. When the storage modulus is taken as a logarithmic axis on the ordinate, and the temperature (° C.) is taken as a linear axis on the abscissa, an abrupt reduction in the storage modulus which is observed in the transition of the storage modulus from a solid region to a glass transition region is drawn as a straight line 1 in the solid region, and drawn as a straight line 2 in the glass transition region. Here, the intersection between the straight line 1 and the straight line 2 is a temperature at which the storage modulus abruptly decreases during the temperature rise and a film starts softening, that is, a temperature at which the transition to the glass transition region starts. Thus, this point is defined as a glass transition temperature (Tg) (dynamic viscoelasticity).

In the present invention, the glass transition temperature (Tg) of the (meth)acrylic resin is preferably 90° C. or more in view of the production suitability and heat resistance. The glass transition temperature of the (meth)acrylic resin preferably ranges from 90° C. to 200° C., more preferably from 100° C. to 150° C., and particularly from 110° C. to 150° C.

(Number of Folding-Endurable Times of Optical Film)

In the present specification, the number of folding-endurable times of a film was measured using a folding endurance tester (MIT, BE-201 type manufactured by TESTER SANGYO CO., LTD.) by a sample film (width: 15 mm, length: 80 mm) under a load of 500 g in accordance with JIS P8115 in which the sample was allowed to stand still at 25° C., 65% RH for 1 hour or more. Meanwhile, as in a case of a flexible film, the film was folded in two directions, and how many times the film was folded before being broken was measured. Measurement in each direction was performed three times, and average values in respective directions were obtained. Then, an average value in a direction in which the average value was smaller was set as the number of folding-endurable times.

In the present invention, the number of folding-endurable times of a film is preferably 30 or more in view of brittleness and conveyance suitability of the film. Further, the number is preferably 100 or more, and particularly preferably 200 or more.

(Ratio of Moisture Permeability of Optical Film)

It is desirable that the optical film of the present invention satisfies the following equation (1).

$$P1/P0 \leq 0.8 \qquad \text{Equation (1)}$$

In equation (1), P1 represents a moisture permeability of an optical film in which a compound represented by Formula (1) is added in an amount of 20% by mass, and a rubber elastic body is added in an amount of 15% by mass based on the mass of the (meth)acrylic resin, and P0 represents a moisture permeability of an optical film composed of only the (meth)acrylic resin. Meanwhile, the moisture permeability refers to a value in terms of a film thickness of 40 μm when the value is obtained after the elapse of 24 hours at 40° C. and 90% RH by a method of JIS Z-0208.

In the present invention, P1/P0 is preferably 0.8 or less. Further, P1/P0 is preferably 0.7 or less, and particularly preferably 0.6 or less.

(Ratio of Glass Transition Temperature of Optical Film)

The optical film of the present invention preferably satisfies the following equation (2).

$$T1/T0 \geq 0.75 \quad \text{Equation (2)}$$

In Equation (2), T1 represents a glass transition temperature of an optical film in which a compound represented by Formula (1) is added in an amount of 20% by mass in total, and a rubber elastic body is added in an amount of 15% by mass based on the mass of the (meth)acrylic resin, and T0 represents a glass transition temperature of an optical film composed of only the (meth)acrylic resin.

In the present invention, T1/T0 is preferably 0.75 or more in view of excellent dimensional stability of an obtained optical film. Further, T1/T0 is preferably 0.8 or more, and particularly preferably 0.85 or more. Since the optical film is suppressed from shrinking due to its excellent dimensional stability, it is possible to avoid a problem such as a warpage of a polarizing plate when the polarizing plate is processed.

(Ratio of Number of Folding-Endurable Times of Optical Film)

The optical film of the present invention preferably satisfies the following equation (3).

$$Z1/Z0 \geq 1.1 \quad \text{Equation (3)}$$

In Equation (3), Z1 represents the number of folding-endurable times of an optical film in which a compound represented by Formula (1) is added in an amount of 20% by mass in total, and a rubber elastic body is added in an amount of 15% by mass based on the mass of the (meth) acrylic resin, and Z0 represents the number of folding-endurable times of an optical film composed of only the (meth)acrylic resin.

In the present invention, Z1/Z0 is preferably 1.1 or more. Further, Z1/Z0 is preferably 4 or more, and particularly preferably 10 or more.

The optical film of the present invention is excellent in a heat resistance, and may be efficiently manufactured, and thus is useful for various applications. Also, the film is excellent in the heat resistance and has a low haze value, and thus may be suitably used as an optical film such as a polarizing plate protective film or an optically-compensatory film.

As for preferred applications of the optical film of the present invention, a polarizing plate protective film and an optically-compensatory film will be described.

[Polarizing Plate Protective Film]

The polarizing plate protective film of the present invention has at least one layer of the optical film of the present invention. In the configuration, only one layer of the optical film of the present invention may be included, or two or more layers of the optical film of the present invention may be included. A configuration having only one layer is preferred.

The polarizing plate protective film may have a multi-layered configuration including a layer other than the optical film of the present invention. In a multi-layered configuration including two or more layers of the optical film of the present invention, respective optical films may be the same or different. In the polarizing plate protective film, the surface of the optical film of the present invention may be subjected to a surface treatment or provided with a functional layer as described below. The polarizing plate protective film of the present invention may preferably have a configuration including the optical film of the present invention as at least one side outermost layer (a layer having an air interface).

<Manufacturing Method of Optical Film>

Hereinafter, a method of manufacturing the optical film of the present invention will be described.

In the manufacturing method of the optical film of the present invention, an optical film is manufactured using a solution film formation method. The method includes at least a step of dissolving a (meth)acrylic resin, a compound represented by Formula (1) and a rubber elastic body in a solvent to prepare a (meth)acrylic resin composition (dope composition), a step of casting the dope composition on a support to form a casting film, and a step of drying the casting film and peeling the dried casting film off from the support to obtain a film.

As necessary, after the peeling-off of the casting film, a step of further drying the peeled-off film to remove residual solvent (volatile content) may be further performed.

As necessary, after the peeling-off of the casting film, a step of stretching the peeled-off film in at least uniaxial direction or in biaxial directions if necessary may be performed.

Hereinafter, respective steps will be described.

These steps may be continuously performed by, for example, the film production line illustrated in FIGURE. Meanwhile, the film production line used in the manufacturing method of the present invention is not limited to that illustrated in FIGURE. Meanwhile, in the film production line, an "infiltration film," a "dried film" obtained by dying the infiltration film and a "stretched film" obtained by stretching the dried film may be obtained during the line, while it is assumed that the casting film in the present invention includes all of these films ("infiltration film," "dried film" and "stretched film") after a casting step before a peeling-off step, and it is assumed that the film in the present invention includes all of these films ("infiltration film," "dried film" and "stretched film") peeled off from the support after the peeling-off step.

A film production line 20 illustrated in FIGURE includes a stock tank 21, a filtration device 30, a casting die 31, a metal support 34 stretched across rotating rollers 32 and 33 and a tenter dryer 35. Also, a selvedge cutting device 40, a drying chamber 41, a cooling chamber 42 and a winding chamber 43 are arranged.

The stock tank 21 is mounted with a stirrer 61 configured to rotate by a motor 60. The stock tank 21 is connected to the casting die 31 via a pump 62 and the filtration device 30.

The width of the casting die 31 is preferably 1.1 to 2.0 times a width of a film as a final product.

Under the casting die 31, the metal support 34 stretched across the rotating rollers 32 and 33 is provided. The rotating rollers 32 and 33 are rotated by a driving device (not illustrated), and the metal support 34 runs in an endless manner in association with the rotation.

In order to keep the surface temperature of the metal support 34 at a predetermined value, it is preferable that a heat transfer medium circulator 63 is attached to the rotating rollers 32 and 33. It is preferable that the surface temperature of the metal support 34 is adjustable within a range of −20° C. to 40° C.

It is preferable that the width of the metal support 34 to be used is 1.1 to 2.0 times the casting width of a dope composition 22. Also, preferably, the length thereof ranges from 20 m to 200 m, and the film thickness thereof ranges from 0.5 mm to 2.5 mm. It is preferable that the metal support 34 is ground so as to have a surface roughness of 0.05 µm or less. The metal support 34 is preferably made of stainless steel, and more preferably made of SUS316 so as to have sufficient corrosion resistance and strength. It is preferable that the film thickness unevenness of the metal support 34 in its entirety is 0.5% or less.

Meanwhile, the rotating rollers 32 and 33 may be directly used as supports.

For example, the casting die 31, and the metal support 34 are contained in a casting chamber 64. The casting chamber 64 is provided with a temperature regulator 65 for maintaining an inside temperature thereof at a predetermined value, and a condenser (capacitor) 66 for condensing and recovering a vaporized organic solvent. A recovery device 67 for recovering the condensed and devolatilized organic solvent is disposed at the outside of the casting chamber 64. It is preferable to dispose a decompression chamber 68 for controlling a pressure of a rear portion of the casting bead formed between the casting die 31 and the metal support 34, and this is employed in the present exemplary embodiment.

Air blowing ports 70, 71, 72 and 73 for vaporizing the solvent in a casting film 69 are provided near the peripheral surface of the metal support 34.

A blower 81 is provided in a transfer section 80, and the selvage cutting device 40 at the downstream of the tenter dryer 35 is connected to a crusher 90 for finely shredding chips of side edges (called selvages) of a cut-out film 82.

The drying chamber 41 is provided with many rollers 91. An adsorption recovery device 92 is attached to the drying chamber 41 to adsorb and recover a solvent gas generated due to evaporation. A forced-neutralization device (neutralization bar) 93 is provided at the downstream of the cooling chamber 42 to regulate a charged voltage of the film 82 within a predetermined range (e.g., from −3 kV to +3 kV). Also, in the present exemplary embodiment, a knurling roller 94 is properly disposed at a downstream of the forced-neutralization device 93 to form knurling on both edges of the film 82 by an emboss processing. A winding roller 95 for winding the film 82, and a press roller 96 for controlling tension at the time of winding are provided within the winding chamber 43.

Subsequently, an example of a method of manufacturing the film 82 using the above described film production line (called a band manufacturing device) 20 will be described below.

The dope composition 22 is always homogenized due to rotation of the stirrer 61. During the stirring, the dope composition 22 may be mixed with additives such as, for example, a retardation developer, a plasticizer, and an UV absorber.

(1) Dissolution Step

In a dissolution step, the (meth)acrylic resin composition (dope composition) is prepared. Preferably, in the dissolution step in the present invention, a polymer and additives are dissolved through stirring in an organic solvent to be mainly a good solvent for the polymer, within a melting pot, to form a dope, or a polymer solution is mixed with an additive solution to form a dope composition.

Materials for the dope composition may refer to the descriptions in the column of <optical film> above.

The dope composition is preferably adjusted at a temperature equal to or greater than 0° C. (equal to or greater than a room temperature). The preparation of the dope composition of the present invention may be performed using a preparation method and device of a dope in a conventional solvent casting method.

In the dissolution of the polymer, various dissolution methods such as a method of carrying out the dissolution at a normal pressure, a method of carrying out the dissolution at a temperature not higher than a boiling point of the main solvent, a method of carrying out the dissolution at a temperature not lower than a boiling point of the main solvent under pressure, a method of carrying out the dissolution by a cooling dissolution method as disclosed in, for example, Japanese Patent Laid-Open Publication No. H9-95544, Japanese Patent Laid-Open Publication No. H9-95557 or Japanese Patent Laid-Open Publication No. H9-95538, and a method of carrying out the dissolution at a high pressure as disclosed in Japanese Patent Laid-Open Publication No. H11-21379 may be used. In a viewpoint of the dissolution efficiency, a method of performing the dissolution at a temperature not lower than a boiling point of the main solvent under pressure is particularly preferred. In this case, a (meth)acrylic resin, a solvent (A) and a solvent (B) are put into a pressurized container and tightly sealed, and are stirred with heating at a temperature at which the solvent does not boil under pressure, which is also equal to or higher than the boiling point of the solvent at a room temperature of the solvent.

In a case of the heating, the temperature is generally 40° C. or more, and preferably ranges from 60° C. to 200° C., and more preferably from 80° C. to 110° C.

The concentration of the (meth)acrylic resin in the dope composition preferably ranges from 10% to 40% by mass. During or after dissolution, the dope composition may be added with additives, followed by dissolution and dispersion. The resultant product may be filtered through a filter medium, degassed and fed to a following step by a feed pump.

(2) Casting Step

In the casting step, the above described dope composition is casted on a metal support to form a casting film. Preferably, in the casting step, a dope is fed to a pressure die through the feed pump (e.g., a pressure-type metering gear pump) so that the dope composition is casted from a pressure die slit at a casting position on a metal support such as an endless metal belt which infinitely carries out transfer (e.g., a stainless steel belt), or a rotating metal drum. The dope composition 22 is fed by the pump (e.g., a pressure-type metering gear pump) 62 to the filtration device 30, and filtered by the filtration device 30, and then casted on the metal support 34 from the casting die 31.

A casting bead is formed in a range of the casting die 31 to the metal support 34, and the casting film 69 is formed on the metal support 34. The temperature of the dope composition 22 at the time of casting preferably ranges from −10° C. to 57° C.

The casting film 69 moves along with the movement of the metal support 34. A pressure die is preferred in which a slit shape at a mouthpiece portion of the die may be adjusted so that a film thickness may easily become uniform. As for the pressure die, a coat-hanger die or a T-die may be exemplified, and any die may be preferably used. The surface of the metal support is made into a mirror surface. Two or more pressure dies may be provided on the metal support to increase the film forming rate so that the dope composition may be divided to be multi-layered. Otherwise, preferably, a film having a multi-layered structure may be obtained by a co-casting method for simultaneously casting a plurality of dope compositions.

(3) Solvent Evaporation Step

Then, the casting film 69 is continuously conveyed to a portion where the air blowing port 73 is disposed at the top portion. A drying air is blown toward the casting film 69 from a nozzle of the air blowing port 73. Preferably, the solvent evaporation step may be interposed between the casting step and the peeling-off step. In the solvent evaporation step, the casting film (also called a web: which still contains a large amount of solvent before made into a final product of a polymer film) is heated on the metal support and the solvent is evaporated until the web becomes peelable from the metal support.

In order to evaporate the solvent, a method of blowing air from the web side and/or a method of transferring heat from the rear surface of the metal support by using a liquid, or a method of transferring heat from the front and back sides by using a radiant heat may be exemplified. The rear-surface heat transferring method using the liquid is excellent in a drying efficiency, and thus is preferred. Also, these methods may be combined with each other. In the rear-surface heat transferring method using the liquid, preferably, the heating is performed at a temperature not higher than a boiling point of a main solvent of an organic solvent used for the dope composition or an organic solvent having the lowest boiling point.

(4) Peeling-Off Step

In the peeling-off step, the above described casting film is dried and peeled off from the above described support to obtain a film. When the solvent is evaporated by drying, the casting film 69 becomes a self-supporting polymer film, and is supportedly peeled off as a polymer film 74 from the metal support 34 by a peeling roller 75. In the peeling-off step, preferably, the web of which the solvent is evaporated on the metal support is peeled off at a peeling position. The peeled-off web is transferred to a following step. Meanwhile, at the point of time of peeling-off, when the amount of a residual solvent in the web (the following equation) is too sufficiently large, the peeling-off is difficult. On the contrary, when the drying on the metal support is extremely performed, in the middle of peeling-off, a part of the web may be peeled off.

Preferably, when the web is peeled off from the metal support, the amount of the residual solvent is in a range of 5% to 150% by mass according to the strength/weakness of a drying condition, and the length of the metal support. When the peeling-off is performed at a point of time when the amount of the residual solvent is larger, the amount of the residual solvent at the time of peeling-off is determined according to the balance between the economical speed and quality. In the present invention, the temperature at the peeling position on the metal support may preferably range from −50° C. to 40° C., more preferably from 10° C. to 40° C., and most preferably from 15° C. to 30° C.

Also, the amount of the residual solvent of the web at the peeling position preferably ranges from 10% to 150% by mass, and more preferably from 10% to 120% by mass.

The amount of the residual solvent may be represented by the following equation.

$$\text{Amount of residual solvent (\% by mass)} = [(M-N)/N] \times 100$$

Here, M represents a mass of a web at any point of time, and N represents a mass after the web with the mass M is dried at 110° C. for 3 hours.

The polymer film 74 peeled off under the conditions described above is conveyed through the transfer section 80 provided with a number of rollers to be sent to the tenter dryer 35. In the transfer section 80, a drying air at a desired temperature is blown from the blower 81 to dry the polymer film 74. Here, the temperature of the drying air preferably ranges from 20° C. to 250° C.

The polymer film 74 is preferably stretched in a width direction (TD direction) perpendicular to the conveying direction (MD direction). Through the stretching in the width direction, unevenness occurring when the film is dried on the support or peeled off may be reduced so that a good surface state in a film plane may be obtained. The stretching ratio in the width direction is preferably 10% or more, more preferably 20% or more, and further more preferably 30% or more.

(5) Drying or Heat-Treatment Step, Stretching Step

After the above described peeling-off step, the web is preferably dried using a drying device and/or a tenter device. In the drying device, the web is alternately passed through a plurality of rolls arranged in the drying device to be conveyed. The tenter device is configured to convey the web while clipping both ends of the web by clips.

The polymer film 74 sent to the tenter dryer 35 is dried while being conveyed with both ends thereof being clipped by clips. Here, the stretching in the width direction may be performed using the tenter dryer 35.

Meanwhile, the inside of the tenter dryer 35 may be divided into sections of temperature zones, and a drying condition for each section may be properly adjusted.

In this manner, the polymer film 74 may be stretched in the width direction by the transfer section 80 and/or the tenter dryer 35.

The film may be stretched in the conveying direction in which the rotation speed of the downstream side rollers is increased by the transfer section 80 as compared to that of the upstream side rollers so that the polymer film 74 is given a draw tension in the conveying direction to be stretched.

Here, in the transfer section 80 and/or the tenter dryer 35, the polymer film 74, in an unstretched state, may be dried. Then, only after the amount of the residual solvent in the film becomes 3.0% by mass or less, preferably 1.0% by mass or less, more preferably 0.5% by mass or less, still preferably 0.3% by mass or less, and particularly preferably 0.2% by mass or less, the stretching may be performed.

Meanwhile, when a polymer film of which the amount of the residual solvent is 3.0% by mass or less is stretched, the stretching may be performed after the polymer film in an unstretched state is wound once.

A unit for drying and heat-treatment is generally configured to blow a heated air onto both surfaces of the web. Also, there is a unit for heating by applying microwaves, instead of the air. The temperature, air volume and time may vary according to the solvent to be used, and the conditions may be properly selected according to the kinds of the solvent to be used or combinations thereof.

The polymer film to be stretched may be either a dried film or a wet film, but a wet film is more preferred.

The stretching may be performed either a MD direction or a TD direction, and also biaxial stretching may be performed in both directions. The stretching in each direction of the MD and the TD may be performed in one stage or multiple stages. In the biaxial stretching, the stretching may be performed in the order of MD and TD.

First, the stretching in the conveying direction (MD) of the film will be described.

The stretching ratio in the stretching of the film conveying direction (MD) preferably ranges from 30% to 80%, and particularly from 40% to 60%. The stretching ratio (elongation) of the web at the time of stretching may be achieved by a peripheral speed difference between a metal support speed and a peeling speed (peeling roll draw). For example, when a device having two nip rolls is used, the rotation speed of the nip roll at the outlet side may be increased as compared to the rotation speed of the nip roll at the inlet side so that the film may be preferably stretched in the conveying direction (vertical direction).

Meanwhile, the term "stretching ratio (%)" mentioned herein refers to a ratio obtained by the following equation.

Stretching ratio (%)=100×(length after stretching)−(length before stretching)/length before stretching Here, a surface temperature T1 of the film may preferably have the following range so that the film is stretched without being broken.

$T1 \leq 100°$ C.$-3.2 \times A1$

Here, A1 represents an amount of a residual solvent in a web when stretching is performed in the MD, and preferably ranges from 10% to 30% by mass, and more preferably from 10% to 20% by mass.

Meanwhile, in order to improve the number of folding-endurable times of the film, the surface temperature T1 of the film may preferably have the following range.

$T1 \leq 170°$ C.$-2.8 \times A1$

Hereinafter, the stretching in the direction (TD) perpendicular to the conveying direction of the film will be described.

The stretching ratio in the stretching in the direction (TD) perpendicular to the film conveying direction preferably ranges from 30% to 80%, and particularly preferably from 40% to 60%.

Meanwhile, in the present invention, in the stretching method in the direction (TD) perpendicular to the film conveying direction, the tenter device may be preferably used.

Here, the surface temperature T2 of the film may preferably have the following range so that the film is stretched without being broken.

$T2 \leq 100°$ C.$-3.2 \times A2$

Here, A2 represents an amount of a residual solvent in a web when stretching is performed in the TD, and preferably ranges from 0% to 10% by mass, and more preferably from 0% to 5% by mass. Meanwhile, in order to improve the number of folding-endurable times of the film, the surface temperature T2 of the film may preferably have the following range.

$T2 \leq 170°$ C.$-2.8 \times A2$

Meanwhile, the web may be dried after the stretching step. When the web is dried after the stretching step, the drying temperature, drying air volume and drying time may vary according to the solvent to be used, and the drying conditions may be properly selected according to the kinds of the solvent to be used or combinations thereof.

As described above, the stretching may be performed in the drying step in which the polymer film 74 is passed through the transfer section 80 and the tenter dryer 35 after the polymer film 74 is formed, and the stretching may be performed after the polymer film 74 is dried and wound. In the present invention, when the film is made as an unstretched film, the casting of the film may be performed so that the film thickness preferably ranges from 10 μm to 200 μm, more preferably from 10 μm to 150 μm, further more preferably from 10 μm to 100 μm, and most preferably from 10 μm to 60 μm.

The polymer film 74 is dried by the tenter dryer 35 to a predetermined amount of a residual solvent (volatile content), and fed to the downstream side as the film 82. Both side ends of the film 82 are cut out by the selvage cutting device 40. The cut-out side ends are sent to the crusher 90 by a cutter blower (not illustrated). The film side ends are shredded by the crusher 90 to be made into chips. These chips are reused for preparing the dope composition and thus, this method is effective in a viewpoint of a cost. Meanwhile, this step of cutting out the both side ends of the film may be omitted, but is preferably performed at any of steps from the foregoing casting step to the foregoing step of winding the film.

The film 82 of which the both side ends are cut out is sent to the drying chamber 41 and dried again. The temperature within the drying chamber 41 preferably ranges from 50° C. to 160° C. In the drying chamber 41, the film 82 is conveyed while wound on the rollers 91, and herein, the solvent gas generated by evaporation is adsorbed and recovered by the adsorption recovery device 92. The air from which the solvent component is removed is blown again, as a drying air, toward the inside of the drying chamber 41. Meanwhile, the drying chamber 41 is more preferably divided into a plurality of sections in order to change the drying temperature.

The film 82 is cooled to substantially a room temperature in the cooling chamber 42. A humidity control chamber (not illustrated) may be provided between the drying chamber 41 and the cooling chamber 42. When the humidity control chamber is provided, an air of which the humidity and temperature are controlled to desired values is preferably blown to the film 82. Accordingly, it is possible to suppress the occurrence of curling in the film 82 or the occurrence of a winding failure at the time of winding.

Further, in the present invention, the knurling roller 94 may be provided to form knurling on at least one end of the film 82 through embossing. The width of the knurling preferably ranges from 3 mm to 50 mm, and more preferably from 5 mm to 30 mm, and the height preferably ranges from 0.5 μm to 500 μm, and more preferably from 1 μm to 200 μm. This knurling may be formed on only one side surface or on each of both surfaces.

(6) Winding

Finally, the film 82 is wound by the winding roller 95 within the winding chamber 43. Here, the winding is preferably performed while applying a desired tension by a press roller 96. It is more preferable that the tension is gradually changed from the winding initiation to the winding termination. The winding is performed so that the length of the film obtained as described above preferably ranges from 100 m to 10000 m per roll, more preferably from 500 m to 7000 m, and further more preferably from 1000 m to 6000 m. The width of the film preferably ranges from 0.5 m to 5.0 m, more preferably from 1.0 m to 3.0 m, and further more preferably from 1.0 m to 2.5 m. When the knurling is performed, the knurling may be preferably formed on at least one end, in which the width of the knurling preferably ranges from 3 mm to 50 mm, and more preferably from 5 mm to 30 mm, and the height preferably ranges from 0.5 μm to 500 μm, and more preferably from 1 μm to 200 μm. This may be performed by single pressing or pressing at both sides.

By winding the web obtained as described, the optical film of the present invention may be obtained.

In the solution film formation method, when the dope composition is casted, a simultaneous multilayer co-casting or a sequential multilayer co-casting of two or more kinds of dope compositions may be performed. Also, both co-casting methods may be combined with each other. When the simultaneous multilayer co-casting is performed, a casting die attached with a feed block may be used, and a multi-manifold type casting die may be used. A multi-layered film may be obtained through co-casting. In the multi-layered film, preferably, at least any one of a thickness of a layer at an air side and a thickness of a layer at a support side ranges from 0.5% to 30% based on the total film thickness of the film. In a case of the simultaneous multilayer co-casting, when the dope composition is casted from the die slit to the metal support, it is desirable that a high-viscosity dope composition is enclosed by a low-viscosity dope composition.

Structures of, for example, a casting die, a decompression chamber, and a metal support, co-casting, peeling-off, stretching, a drying condition of each step, handling methods, curling, winding methods after planarity correction and recovering methods of a solvent, and recovering methods of a film are described in detail in paragraphs [0617] to [0889] of Japanese Patent Laid-Open Publication No. 2005-104148.

In the above described method of manufacturing the optical film of the present invention, as an example, the dope composition is casted on a band in the casting step. However, the same mechanism may be applied to a case where the dope composition is casted on a drum in the casting step. In this case, an apparatus or a manufacturing condition disclosed in Japanese Patent Laid-Open Publication No. 2013-82192 is preferably used.

[Optically-Compensatory Film]

The optical film of the present invention may be used for various applications other than for the above described polarizing plate protective film. For example, it may be preferably used as an optically-compensatory film for a liquid crystal display device. Meanwhile, the optically-compensatory film refers to an optical material which is generally used for a liquid crystal display device to compensate a phase difference, and is synonymous with, for example, a phase difference plate, and an optically-compensatory sheet. The optically-compensatory film has a birefringence and is used to remove coloration of a display screen of the liquid crystal display device, or to improve the characteristic of a viewing angle.

The optical film of the present invention itself may be used as an optically-compensatory film. Otherwise, the optical film may be used as a support of an optically-compensatory film, and an optically anisotropic layer may be formed on the support. The optically anisotropic layer is not restricted by an optical performance or a driving method of a liquid crystal cell of a liquid crystal display device in which the optical film of the present invention is used. Any optically anisotropic layer required as the optically-compensatory film may be used in combination. As for the optically anisotropic layer used in combination, a composition containing a liquid crystalline compound may be formed, or a thermoplastic film having birefringence may be formed.

[Configuration to be Added to Film]

The optical film of the present invention may have an additional configuration depending on its use. As for such a configuration, a surface treatment performed on a film surface or a functional layer formed on a film surface may be exemplified. Hereinafter, the surface treatment and the functional layer will be described.

(Surface Treatment)

The optical film of the present invention may be subjected to a surface treatment in some cases to improve adhesion between the film and another layer (e.g., a polarizer, an undercoat layer and a back layer). For example, a glow discharge treatment, a UV irradiation treatment, a corona treatment, a flame treatment and an acid or alkali treatment may be used. In the glow discharge treatment mentioned herein, a low temperature plasma treatment under a low pressure gas of $10^{-3}$ Torr to 20 Torr or a plasma treatment under atmospheric pressure may be performed. A plasma-exited gas refers to a gas excited by plasma under the above described condition, and examples thereof may include argon, helium, neon, krypton, xenon, nitrogen, carbon dioxide, fluorocarbons such as tetrafluoromethane and a mixture thereof. These are described in detail in p. 30 to 32 of Journal of Technical Disclosure (Kogi No. 2001-1745, published on Mar. 15, 2001, Japan Institute of Invention and Innovation), and may be preferably used in the present invention.

(Functional Layer)

In the optical film of the present invention, a functional layer with a film thickness ranging from 0.1 μm to 20 μm may be laminated on at least one side surface of the above described film. The kind of the functional layer is not particularly limited, but examples thereof may include a hard coat layer, an anti-reflective layer (a layer with a controlled refractive index such as a low refractive index layer, a middle refractive index layer, a high refractive index layer), an anti-glare layer, an antistatic layer, a UV absorbing layer, and a moisture permeability reducing layer.

The functional layer may be a single layer, and a plurality of functional layers may be provided. A method of laminating the functional layer is not particularly limited, but preferably, the functional layer may be formed through co-casting with a (meth)acrylic resin composition for forming the optical film of the present invention, and may be formed by being coated on the optical film of the present invention.

When the functional layer is formed through coating and drying, as for a binder, a monomer having an ethylenically unsaturated group may be preferably used. The monomer may be a multifunctional or monofunctional. Particularly, it is preferred to use a polymerizable polyfunctional monomer, it is more preferred to use a photopolymerizable polyfunctional monomer, and it is particularly preferred to use a coating liquid containing a monomer having two or more (meth)acryloyl groups.

Specific examples of the monomer having two or more (meth)acryloyl groups may include: (meth)acrylic acid diesters of alkylene glycols such as neopentylglycolacrylate, 1,6-hexanediol(meth)acrylate, or propyleneglycoldi(meth)acrylate;

(meth)acrylic acid diesters of polyoxyalkylene glycols such as triethyleneglycoldi(meth)acrylate, dipropyleneglycoldi(meth)acrylate, polyethyleneglycoldi(meth)acrylate, or polypropyleneglycoldi(meth)acrylate;

(meth)acrylic acid diesters of polyhydric alcohols such as pentaerythritol di(meth)acrylate; and (meth)acrylic acid diesters of ethylene oxides or propyleneoxide adducts such as 2,2-bis4-(acryloxy.diethoxy)phenyl propane, or 2-2-bis4-(acryloxy-polypropoxy)phenyl propane.

Further, epoxy(meth)acrylates, urethane(meth)acrylates, and polyester(meth)acrylates are also preferably used as photopolymerizable polyfunctional monomers.

Among them, esters of polyhydric alcohols and (meth)acrylic acids are preferred. The polyhydric alcohol refers to a divalent or higher polyvalent alcohol.

More preferably, a polyfunctional monomer having three or more (meth)acryloyl groups in one molecule is preferred.

Examples thereof may include pentaerythritoltetra(meth)acrylate, pentaerythritoltri(meth)acrylate, trimethylolpropanetri(meth)acrylate, ethyleneoxide-modified trimethylolpropanetri(meth)acrylate, propyleneoxide-modified trimethylolpropanetri(meth)acrylate, ethyleneoxide-modified phosphoric acid tri(meth)acrylate, trimethylolethanetri(meth)acrylate, ditrimethylolpropanetetra(meth)acrylate, dipentaerythritoltetra(meth)acrylate, dipentaerythritolpenta(meth)acrylate, dipentaerythritolhexa(meth)acrylate, 1,2,3-cyclohexanetetramethacrylate, polyurethanepolyacrylate, polyesterpolyacrylate, and caprolactone-modified tris(acryloxyethyl)isocyanurate.

Also, a resin having three or more (meth)acryloyl groups such as, for example, a relative low molecular weight polyester resin, a polyether resin, an acrylic resin, an epoxy resin, an urethane resin, an alkyd resin, a spiroacetal resin, a polybutadiene resin, and a polythiolpolyene resin, and an oligomer or prepolymer of a polyfunctional compound such as polyhydric alcohol may be exemplified.

As for another polyfunctional monomer, for example, a dendrimer disclosed in Japanese Patent Laid-Open Publication Nos. 2005-76005 and 2005-36105 may be used.

Also, as for the polyfunctional monomer, amides of polyhydric alcohols and isocyanates containing a plurality of (meth)acryloyl groups may be preferably used.

As for the polyhydric alcohol, an aliphatic alcohol is preferred, and particularly, an alcohol having a cyclic aliphatic hydrocarbon group is more preferred. As for the aliphatic group of a monocyclic alicyclic alcohol, a cycloalkyl group having 3 to 8 carbon atoms is preferred, and a cyclopentyl group, a cyclohexyl group, a cyclobutyl group, and an cyclooctyl group may be exemplified.

As for the aliphatic group of a polycyclic alicyclic alcohol, a group having a bicyclo, tricyclo or tetracyclo structure having 5 or more carbon atoms may be exemplified, and a cycloalkyl group having 6 to 20 carbon atoms is preferred. For example, an adamantly group, a norbornyl group, a dicyclopentyl group, a tricyclodecanyl group, a tetracyclododecyl group, a central skeleton of a compound disclosed in claims of Japanese Patent Laid-Open Publication No. 2006-215096, and a central skeleton of a compound disclosed in Japanese Patent Laid-Open Publication No. 2001-10999 may be exemplified. Meanwhile, a part of carbon atoms in the cycloalkyl group may be substituted by heteroatoms such as oxygen atoms.

Among them, as for a polycyclic alcohol, polyhydric alcohols having an adamantly group, a norbornyl group, a dicyclopentyl group, a tricyclodecanyl group, a tetracyclododecyl group, a central skeleton of a compound disclosed in claims of Japanese Patent Laid-Open Publication No. 2006-215096, and a central skeleton of a compound disclosed in Japanese Patent Laid-Open Publication No. 2001-10999 are particularly preferred in view of reducing the moisture permeability.

Two or more kinds of polymerizable polyfunctional monomers may be used in combination. The polymerization of these monomers having ethylenically unsaturated groups may be performed by irradiation of ionizing radiation or heating in the presence of a photo-radical initiator or a thermal-radical initiator.

In the polymerization reaction of the photopolymerizable polyfunctional monomer, a photo-polymerization initiator is preferably used. As for the photo-polymerization initiator, a photo-radical polymerization initiator and a photocationic polymerization initiator are preferred, and a photo-radical polymerization initiator is particularly preferred.

It is also preferable to use the above described polymerizable polyfunctional monomer and a monofunctional monomer in combination.

As for the monofunctional monomer, a monomer having one (meth)acryloyl group is preferred, and the monomer having one (meth)acryloyl group is generally obtained from a monohydric alcohol and acrylic acid.

The monohydric alcohol described above may be an aromatic alcohol or an aliphatic alcohol.

Examples of the monohydric alcohol may include methyl alcohol, n-propylalcohol, iso-propylalcohol, n-butylalcohol, tert-butylalcohol, n-amylalcohol, diacetonealcohol, 1-methoxy-2-propanol, furfurylalcohol, 2-octanol, 2-ethylhexanol, nonanol, n-decanol, undecanol, n-dodecanol, trimethylnonylalcohol, benzylalcohol, phenethylalcohol, ethylene glycolmonoisoamylether, ethyleneglycolmonophenyl ether, ethyleneglycolmonobenzylether, and ethyleneglycolmonohexylether.

The aliphatic portion of the aliphatic alcohol may be cyclic aliphatic. The cyclic aliphatic group may be monocyclic or polycyclic, and a polycyclic group may be a bridged-type group. As for a monocyclic group, a cycloalkyl group having 3 to 8 carbon atoms is preferred, and a cyclopentyl group, a cyclohexyl group, a cyclobutyl group, and a cyclooctyl group are exemplified. As for a polycyclic group, a group having a bicyclo, tricyclo or tetracyclo structure having 5 or more carbon atoms may be exemplified, and a cycloalkyl group having 6 to 20 carbon atoms is preferred. For example, an adamantyl group, a norbornyl group, a dicyclopentyl group, a tricyclodecanyl group, a tetracyclododecyl group, a central skeleton of a compound disclosed in claims of Japanese Patent Laid-Open Publication No. 2006-215096, and a central skeleton of a compound disclosed in Japanese Patent Laid-Open Publication No. 2001-10999 may be exemplified. Meanwhile, a part of carbon atoms in the cycloalkyl group may be substituted by heteroatoms such as oxygen atoms.

The monohydric alcohol may be an aromatic alcohol or an aliphatic alcohol, and preferably has 6 or more carbon atoms.

As for the (meth)acrylic acid, an acrylic acid or a methacrylic acid is preferred.

Various additives may be added to a material for the functional layer in order to manufacture an anti-reflective layer (a layer with a controlled refractive index such as a low refractive index layer, a middle refractive index layer, a high refractive index layer), an anti-glare layer, an antistatic layer, a UV absorbing layer, or a moisture permeability reducing layer, as for the functional layer.

The thickness of the functional layer more preferably ranges from 0.01 μm to 100 μm, and particularly preferably from 0.02 μm to 50 μm. More particularly, it is preferable that a functional layer for reducing the moisture permeability has a thickness ranging from 0.1 μm to 20 μm.

In a case of the functional layer for reducing the moisture permeability, a ratio of the moisture permeability (C) of an optical film having the functional layer laminated therein, to the moisture permeability (D) of an optical film with no laminated functional layer is preferably 0.9 or less, and more preferably 0.85 or less, and further more preferably 0.8 or less.

<Polarizing Plate>

Hereinafter, a polarizing plate of the present invention will be described.

The polarizing plate of the present invention is characterized in that it has a polarizing plate protective film of the present invention. The configuration of the polarizing plate protective film of the present invention may refer to the descriptions in the column of [polarizing plate protective film] above.

The polarizing plate may be manufactured by a general manufacturing method. There is a method in which the polarizing plate protective film of the present invention is subjected to an alkali treatment, and is bonded to both surfaces of a polarizer through a completely saponified polyvinylalcohol aqueous solution. The polarizer is manufactured by dipping a polyvinylalcohol film in an iodine solution and stretching the film. Instead of the alkali treatment, an easy-to-bond processing as disclosed in Japanese Patent Laid-Open Publication No. H6-94915, and Japanese Patent Laid-Open Publication No. H6-118232 may be performed. also, above described surface treatment may be carried out.

As for an adhesive used for bonding the treated surface of the polarizing plate protective film to the polarizer, a polyvinylalcohol-based adhesive such as polyvinylalcohol or polyvinylbutyral, and a vinyl-based latex such as butyl acrylate may be exemplified.

The polarizing plate protective film and the polarizer may be bonded to each other through other adhesives or sticking agents, or may be directly laminated without any adhesive or sticking agent.

<Liquid Crystal Display Device>

The liquid crystal display device of the present invention is characterized in that it has the polarizing plate of the present invention, and preferably includes a liquid crystal cell, and the polarizing plate of the present invention which is disposed at least one side of the liquid crystal cell. More preferably, the polarizing plate protective film of the present invention, which is included in the above described polarizing plate, is disposed as the outermost layer.

EXAMPLES

The present invention will be described in detail with reference to Examples. For example, materials, reagents, amounts and ratios of substances, and operations illustrated in the following examples below may be appropriately changed without departing from the spirit of the present invention. Accordingly, the present invention is not limited to the following examples.

<Preparation of Material>
((Meth)Acrylic Resin)

An acrylic resin described below was used. MMA represents a structural unit derived from methyl methacrylate.

Preparation Example 1: Preparation of Acrylic Resin A

Acrylic resin A (weight-average molecular weight: 1.3 million, MMA ratio: 100%) was synthesized by the following method and was used in Examples 1 to 6, and Comparative Examples 1 to 4.

300 g of ion-exchange water and 0.6 g of polyvinyl alcohol (degree of saponification: 80%, degree of polymerization: 1700) were charged to a 1 L three-necked flask provided with a mechanical stirrer, a thermometer, and a cooling tube and stirred to completely dissolve polyvinyl alcohol. Then, 100 g of methyl methacrylate, and 0.15 g of benzoyl peroxide were added thereto, followed by a reaction at 85° C. for 6 hours. The resulting suspension was filtered through a nylon filtering cloth, and washed with water, and the filtrate was dried overnight at 50° C. to obtain a desired polymer in a bead form (92.0 g).

Other Preparation Examples

Acrylic resin B (weight-average molecular weight: 0.8 million, MMA ratio: 100%) was prepared through the same synthesis method as in preparation example 1 except that the addition amount of benzoyl peroxide was changed to 0.23 g. This acrylic resin B was used in Example 7.

Acrylic resin C (weight-average molecular weight: 0.5 million, MMA ratio: 100%) was prepared through the same synthesis method as in preparation example 1 except that the addition amount of benzoyl peroxide was changed to 0.36 g. This acrylic resin C was used in Example 8.

Acrylic resin D (weight-average molecular weight: 0.1 million, MMA ratio: 100%) was prepared through the same synthesis method as in preparation example 1 except that the addition amount of benzoyl peroxide was changed to 1.83 g. This acrylic resin D was used in Example 9.

Synthesis Example 1: Synthesis of A-30

83 g of phenol and 5 g of n-octyl mercaptan were charged to a 1 L three-necked flask provided with a thermometer, stirring blades, a dropping funnel and a reflux cooling tube, and the inside of the system was replaced with nitrogen. Then, 25.2 g of 3,3,5-trimethylcyclohexanone was charged thereto, and the temperature was maintained at 45° C. while a hydrogen chloride gas was blown thereto, followed by a reaction for 4 hours. After the completion of the reaction, the resultant product was neutralized by being added with 12% by mass of aqueous sodium hydroxide, and heated up to 80° C., first, and then cooled to a room temperature. Then, the precipitate crystals were filtered. The obtained crude crystals were dispersed and dissolved in a large amount of toluene, dehydrated through azeotropic dehydration, added with 5 g of activated clay, and stirred by for 30 min under reflux. The activated clay was removed by thermal filtration, and the obtained filtrate was added with 28 g of water to be recrystallized so that target compound A-30 corresponding to Formula (1) of the present invention was obtained (43 g, white crystals).

Synthesis Example 2: Synthesis of A-27

Target compound A-27 (30 g, white crystals) corresponding to Formula (1) of the present invention was obtained in the same manner as in Synthesis Example 1 except that 3,3,5-trimethylcyclohexanone was changed to cyclohexanone.

Synthesis Example 3: Synthesis of A-7

Target compound A-7 (30 g, white crystals) corresponding to Formula (1) of the present invention was obtained in the same manner as in Synthesis Example 1 except that phenol was changed to 2,6-di-tert-butylphenol, and 3,3,5-trimethylcyclohexanone was changed to cyclobutanone.

Synthesis Example 4: Synthesis of B-1

Target compound B-1 (30 g, white crystals) was obtained in the same manner as in Synthesis Example 1 except that 3,3,5-trimethylcyclohexanone was changed to 2-octanone.

Example 1

[Manufacturing of Film]
(Dissolution Step: Preparation of (Meth)Acrylic Resin Composition)

The compositions noted below were charged to a mixing tank, and stirred under heating so that respective components were dissolved to prepare a (meth)acrylic resin composition.

| (Composition of (meth)acrylic resin composition) | |
| --- | --- |
| Acrylic resin A | 100 parts by mass |
| Additive A-30 | 20 parts by mass |
| Rubber elastic body C-1 | 15 parts by mass |
| Dichloromethane | 534 parts by mass |
| Methanol | 46 parts by mass |

Meanwhile, as for rubber elastic body C-1, Kane Ace M-210 (manufactured by Kaneka Corporation) was used.

<Formation of Film>
(Casting Step)

Using the film production line as illustrated in FIGURE, the prepared (meth)acrylic resin composition (dope composition) was uniformly casted with a width of 2000 mm on a stainless steel endless band (metal support) from a casting die to form a casting film.

(Peeling-Off Step)

The casting film was peeled off as a film from a metal support at a point of time when the amount of the residual solvent in the (meth)acrylic resin composition becomes 20% by mass.

The film was conveyed without being actively stretched in a tenter and dried in a drying zone at 140° C.

Through the above described steps, a film with a thickness of 40 μm was manufactured. A single-layer film of the film obtained as described above was used as an optical film in Example 1.

Examples 2 to 9, Comparative Examples 1 to 4

Optical films in Examples 2 to 9 and Comparative Examples 1 to 4 were obtained in the same manner as in Example 1 except that a (meth)acrylic resin and an additive, and an addition amount of the additive in a (meth)acrylic resin composition were changed as noted in Table 1.

The moisture permeability, the glass transition temperature, and the number of folding-endurable times of each obtained optical film were measured by the following method, and obtained results are noted in Table 1 below.

As for rubber elastic body C-2 noted in Example 5, Kane Ace M-711 (manufactured by Kaneka Corporation) was used.

[Evaluation of Optical Film]
(Moisture Permeability)

As described above, in accordance with a method defined in JIS Z-0208, the moisture permeability of a film, which was measured under conditions of 40° C. and 90% RH, was calculated (moisture permeability in terms of 40 μm).

(Glass Transition Temperature)

A film sample (unstretched, 5 mm×30 mm) was humidified at 25° C. and 60% RH for two hours or more, and then measured by a dynamic viscoelasticity measuring device (Vibron: DVA-225 (manufactured by ITK Co., Ltd.)) at a chuck-to-chuck distance of 20 mm, a temperature rise rate 2° C./min, a measurement temperature range from 30° C. to 250° C., and a frequency of 1 Hz. Then, an abrupt reduction in the storage modulus was drawn as a straight line 1 in the solid region, and drawn as a straight line 2 in the glass transition region. The intersection between the straight line 1 and the straight 2 was plotted to obtain a glass transition temperature (Tg).

(Number of Folding-Endurable Times)

The number of folding-endurable times was measured using a folding endurance tester (MIT, BE-201 type manufactured by TESTER SANGYO CO., LTD.) by a sample film (width: 15 mm, length: 80 mm, thickness: 40 μm) under a load of 500 g in accordance with JIS P8115 in which the sample was allowed to stand still at 25° C., 65% RH for 1 hour or more.

(Ratio of Moisture Permeability of Optical Film)

A moisture permeability (P1) of an optical film in which a compound represented by Formula (1) or (2) was added in an amount of 20% by mass, and a rubber elastic body was added in an amount of 15% by mass based on the mass of an acrylic resin, and a moisture permeability (P0) of an optical film composed of only the acrylic resin were obtained, respectively, and a ratio of P1 to P0 was calculated.

(Ratio of Glass Transition Temperature of Optical Film)

A glass transition temperature (T1) of an optical film in which a compound represented by Formula (1) or (2) was added in an amount of 20% by mass, and a rubber elastic body was added in an amount of 15% by mass based on the mass of an acrylic resin, and a glass transition temperature (T0) of an optical film composed of only the acrylic resin were obtained, respectively, and a ratio of T1 to T0 was calculated.

(Ratio of Number of Folding-endurable Times of Optical Film)

A number of folding-endurable times (Z1) of an optical film in which a compound represented by Formula (1) or (2) was added in an amount of 20% by mass, and a rubber elastic body was added in an amount of 15% by mass based on the mass of an acrylic resin, and a number of folding-endurable times (Z0) of an optical film composed of only the acrylic resin were obtained, respectively, and a ratio of Z1 to Z0 was calculated.

TABLE 1

| | | | Compound of Formula (1) | | Rubber elastic body | | Moisture permeability @ in terms of 40 μm g/m²/day | P1/P0 | Tg ° C. | T1/T0 | Number of folding-endurable times @40 μm | Z1/Z0 |
| --- | --- | --- | --- | --- | --- | --- | --- | --- | --- | --- | --- | --- |
| | Resin | Mw | Kind | Addition amount | Kind | Addition amount | | | | | | |
| Example 1 | Acrylic resin A | 1,300,000 | A-30 | 20 | C-1 | 15 | 48 | 0.68 | 109.0 | 0.89 | 100 | 4.3 |
| Example 2 | Acrylic resin A | 1,300,000 | A-27 | 20 | C-1 | 15 | 41 | 0.58 | 91.7 | 0.75 | 800 | 34 |

TABLE 1-continued

| | Resin | Mw | Compound of Formula (1) Kind | Addition amount | Rubber elastic body Kind | Addition amount | Moisture permeability @ in terms of 40 μm g/m²/day | P1/P0 | Tg ° C. | T1/T0 | Number of folding-endurable times @40 μm | Z1/Z0 |
|---|---|---|---|---|---|---|---|---|---|---|---|---|
| Example 3 | Acrylic resin A | 1,300,000 | A-30 | 30 | C-1 | 15 | 32 | 0.45 | 100.0 | 0.81 | 50 | 2 |
| Example 4 | Acrylic resin A | 1,300,000 | A-30 | 20 | C-1 | 20 | 52 | 0.74 | 109.0 | 0.89 | 700 | 30 |
| Example 5 | Acrylic resin A | 1,300,000 | A-30 | 20 | C-2 | 20 | 52 | 0.74 | 109.0 | 0.89 | 1000 | 43 |
| Example 6 | Acrylic resin A | 1,300,000 | A-7 | 20 | C-1 | 15 | 55 | 0.78 | 103.6 | 0.84 | 323 | 14 |
| Example 7 | Acrylic resin B | 800,000 | A-30 | 20 | C-1 | 15 | 48 | 0.68 | 109.0 | 0.89 | 90 | 3.9 |
| Example 8 | Acrylic resin C | 500,000 | A-30 | 20 | C-1 | 15 | 48 | 0.68 | 109.0 | 0.89 | 70 | 3.0 |
| Example 9 | Acrylic resin D | 100,000 | A-30 | 20 | C-1 | 15 | 48 | 0.68 | 109.0 | 0.89 | 50 | 2.1 |
| Comp. Example 1 | Acrylic resin A | 1,300,000 | — | 0 | — | 0 | 70 | 1.00 | 122.8 | 1.00 | 23 | 1.0 |
| Comp. Example 2 | Acrylic resin A | 1,300,000 | — | 0 | C-1 | 15 | 81 | 1.15 | 122.4 | 1.00 | 1059 | 45 |
| Comp. Example 3 | Acrylic resin A | 1,300,000 | A-7 | 20 | — | 0 | 52 | 0.74 | 103.6 | 0.84 | 5 | 0.2 |
| Comp. Example 4 | Acrylic resin A | 1,300,000 | B-1 | 20 | C-1 | 15 | 56 | 0.79 | 79.7 | 0.65 | 904 | 39 |

In Table 1 above, the numerical values noted in the column "addition amount" refer to parts by mass of a compound represented by Formula (1) and parts by mass of a rubber elastic body based on 100 parts by mass of a resin.

From Table 1 above, it was found that in the optical film in each of Examples, a moisture permeability was low, a reduction of a glass transition temperature was small, and a brittleness was excellent.

In contrast, in the optical film of Comparative Example 1 which does not include the compound represented by Formula (1), a moisture permeability was higher, and a brittleness was poor as compared to in Examples. In the optical film of Comparative Example 2 which includes only a rubber elastic body, a moisture permeability was higher as compared to in Examples, and in the optical film of Comparative Example 3 which includes only a compound represented by Formula (1), a brittleness was poor as compared to in Examples. In the optical film of Comparative Example 4 which includes a compound other than the compound represented by Formula (1), Tg was lower and a heat resistance was inferior as compared to in Examples, and the optical film was inferior in terms of a dimensional stability and thus shrank from its original dimension.

<Manufacturing of Polarizing Plate>
<Manufacturing of Films 1 to 9 Having Hard Coat Layer>
[Preparation of Coating Composition for Forming HCL-1 Hard Coat Layer]

8 parts by mass of Pentaerythritol triacrylate, 0.5 parts by mass of Irgacure 127 (manufactured by BASF), and 4 parts by mass of a bifunctional acrylic compound represented by Formula C-3 below were mixed with each other to prepare a coating material (HCL-1) for forming a hard coat layer.

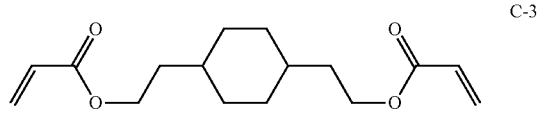 [SMILES: C=CC(=O)OCCC1CCC(CCOC(=O)C=C)CC1]

C-3

[Manufacturing of Hard Coat Layer]

On each of optical films 1 to 9 manufactured as described above, the coating liquid (HCL-1) for forming a hard coat layer was coated by a die coating method, and dried at 80° C. for 5 min. Then, the coated layer was cured under a nitrogen purge by irradiation with UV rays in a dose of 300 mJ/cm² using an "air-cooled metal halide lamp" (240 W/cm, manufactured by EYE GRAPHICS Co., Ltd.) to form a hard coat layer having a dried film thickness of 5 μm.

In this manner, films 1 to 9 having hard coat layers were manufactured in which each of optical films 1 to 9 as manufactured above has a hard coat layer thereon.

<Manufacturing of Polarizing Plate>
[Manufacturing of Polarizer]

By adsorbing iodine on a stretched polyvinyl alcohol film, a polarizer with a film thickness of 20 μm was manufactured. In the manufacturing of the polarizer, for example, the method described in Example 1 of Japanese Patent Application Laid-Open No. 2001-141926 may be used, and a PVA layer formed on an amorphous PET substrate may be stretched as the polarizing film 1 described in Japanese Patent Laid-Open Publication No. 2013-008019.

[Manufacturing of Polarizing Plate Used for Liquid Crystal Display Device 3]
(Manufacturing of Polarizing Plate Using Bonding Method A)
[Adhesive for Polarizing Plate]

100 parts by mass of 2-hydroxyethyl acrylate, 10 parts by mass of tolylene diisocyanate and 3 parts by mass of photo-polymerization initiator (Irgacure 907, manufactured by BASF) were blended with each other to prepare an adhesive for a polarizing plate.

Film 1 having a hard coat layer and optical film 1 were prepared, and the adhesive for a polarizing plate was applied to the two films to a thickness of 5 μm using a micro gravure coater (gravure roll: #300, rotational speed: 140%/line speed) so that the optical films are coated with the adhesive. Then, the two adhesive-coated films were bonded to both surfaces of the polarizer using a rolling device through a roll-to-roll method so that the polarizer with a film thickness of 20 μm was sandwiched between the two films. UV rays were irradiated at the sides of the bonded optical films (both sides) so that polarizing plate 1 using bonding method A was manufactured. Meanwhile, the line speed was 20 m/min, and the accumulated amount of UV light was 300 mJ/cm². Here, the transmission axis of the polarizer and the conveying direction of a film were arranged to be orthogonal. Similarly, polarizing plates 2 to 9 using bonding method A were manufactured in the same manner as in manufacturing of polarizing plate 1 using bonding method A except that instead of film 1 having a hard coat layer and optical film 1, films 2 to 9 having a hard coat layer and optical films 2 to 9 were used.

(Manufacturing of Polarizing Plate Using Bonding Method B)

A polarizing plate protective film in each of Examples, and FujiTac TD60UL (manufactured by Fujifilm Corporation) were dipped for 1 min in 4.5 mol/L of aqueous sodium hydroxide (saponified solution) maintained at a temperature of 37° C. Each film was washed, and then dipped for 30 sec in 0.05 mol/L of sulfuric acid aqueous solution, and was passed through a washing bath again. Then, draining by air knife was repeated three times to remove the water, and the resultant product was stayed in a drying zone of 70° C. for 15 sec and dried to manufacture a saponified film.

In accordance with Example 1 of Japanese Patent Laid-Open Publication No. 2001-141926, a peripheral speed difference was applied between two pairs of nip rolls, and then a polarizer with a thickness of 20 μm was prepared through longitudinal stretching.

Two films were selected from saponified films and the polarizer obtained as described above was interposed between the two films. The two films were bonded in a roll-to-roll method in such a manner that a polarization axis and a longitudinal direction of a film are orthogonal by a 3% aqueous solution of PVA (manufactured by Kuraray Co., Ltd., PVA-117H) as an adhesive so that polarizing plates 1 to 9 using bonding method B were prepared. Here, a film at one side of the polarizer was one saponified film selected from the group consisting of optical films in each of Examples, and a film at the other side was a saponified film of Fujitac TD60UL.

The optical film in each of Examples showed a sufficient bonding property with polyvinyl alcohol regardless of which one of bonding methods A and B was employed, and had an excellent polarizing plate processing suitability.

(Evaluation of Display Performance in IPS Type Liquid Crystal Display Device)

From a commercially available LCD TV (IPS mode slim-type 42-inch LCD TV), polarizing plates having a liquid crystal cell interposed between the polarizing plates were peeled off, and the polarizing plates manufactured by the above described method were re-bonded to the liquid crystal cell by a sticking agent so that an optical film side of each example is arranged at the liquid crystal cell side. The re-assembled LCD TV was maintained under an environment of 50° C. and 80% RH for 3 days, transferred to an environment of 25° C. and 60% RH, and was continuously lit in a black display state. After 48 hours, through observation with eyes, a light unevenness was evaluated.

In the observation at the front side of the device, when the luminance unevenness was observed in the black display, it was found that the unevenness was hardly visually recognized under an environment of illumination of 100 lx.

What is claimed is:

1. An optical film comprising:
   a (meth)acrylic resin as a main component,
   a compound represented by the following Formula (1), and
   a rubber elastic body:

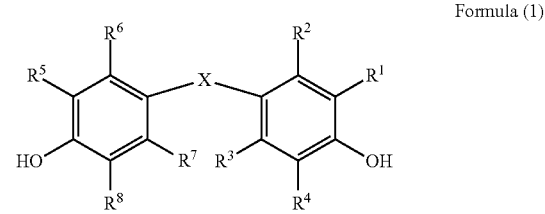

Formula (1)

wherein
each of $R^1$ to $R^8$ independently represents a hydrogen atom, a halogen atom, a hydroxyl group or a hydrocarbon group having 1 to 12 carbon atoms,
X represents a divalent alicyclic group having 4 to 20 carbon atoms,
the alicyclic group represented by X may have at least one substituent selected from a halogen atom, an aliphatic hydrocarbon group having 1 to 12 carbon atoms and an aromatic hydrocarbon group having 6 to 15 carbon atoms, and
wherein the content of the compound represented by Formula (1) is 10 parts by mass to 50 parts by mass based on 100 parts by mass of (meth)acrylic resin.

2. The optical film as claimed in claim 1, wherein the rubber elastic body is an acrylic rubber.

3. The optical film as claimed in claim 1, wherein each of $R^2$, $R^3$, $R^4$, $R^6$, $R^7$ and $R^8$ in Formula (1) represents a hydrogen atom.

4. The optical film as claimed in claim 1, wherein each of $R^1$ and $R^5$ in Formula (1) independently represents a hydrogen atom or a methyl group.

5. The optical film as claimed in claim 1, wherein X in Formula (1) is represented by the following Formula (X1) or Formula (X2):

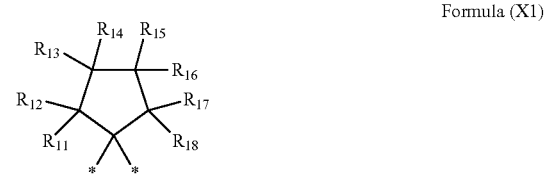

Formula (X1)

in Formula (X1),
each of $R_{11}$ to $R_{18}$ independently represents a hydrogen atom or a hydrocarbon group having 1 to 6 carbon atoms,
at least two of $R_{11}$ to $R_{18}$ may be linked to each other to form an alicyclic ring having 8 or less carbon atoms,
* represents a binding site:

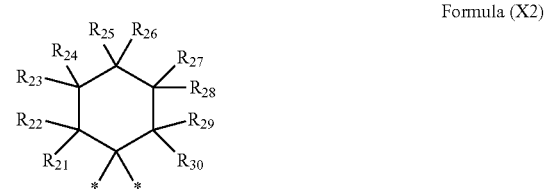

Formula (X2)

in Formula (X2),
each of $R_{21}$ to $R_{30}$ independently represents a hydrogen atom or a hydrocarbon group having 1 to 6 carbon atoms,
at least two of $R_{21}$ to $R_{30}$ may be linked to each other to form an alicyclic ring having 8 or less carbon atoms,
* represents a binding site.

6. The optical film as claimed in claim 5,
wherein each of $R_{11}$ to $R_{18}$ in Formula (X1) and $R_{21}$ to $R_{30}$ in Formula (X2) independently represents a hydrogen atom or a methyl group.

7. A method of manufacturing an optical film through a solution film-forming method,
in which the optical film is composed of a (meth)acrylic resin as a main component, and contains a compound represented by Formula (1) and a rubber elastic body:

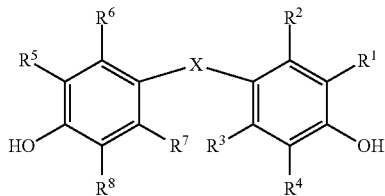

Formula (1)

wherein,
each of $R^1$ to $R^8$ independently represents a hydrogen atom, a halogen atom, a hydroxyl group or a hydrocarbon group having 1 to 12 carbon atoms,
X represents a divalent alicyclic group having 4 to 20 carbon atoms,
the alicyclic group represented by X may have at least one substituent selected from a halogen atom, an aliphatic hydrocarbon group having 1 to 12 carbon atoms and an aromatic hydrocarbon group having 6 to 15 carbon atoms, and wherein the content of the compound represented by Formula (1) is 10 parts by mass to 50 parts by mass based on 100 parts by mass of (meth)acrylic resin.

8. A polarizing plate protective film having the optical film as claimed in claim 1.

9. A polarizing plate having the polarizing plate protective film claimed in claim 8.

10. A liquid crystal display device provided with the polarizing plate claimed in claim 9.

11. The optical film as claimed in claim 1, wherein the compound represented by Formula (1) is a compound selected from at least the following compound (A-7) or compound (A-30):

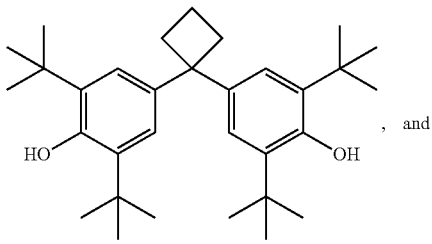

A-7

, and

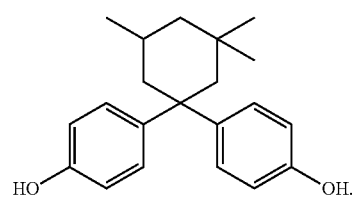

A-30

* * * * *